United States Patent
Hoshida

(10) Patent No.: US 9,071,378 B2
(45) Date of Patent: Jun. 30, 2015

(54) SUPERIMPOSED SIGNAL DETECTION CIRCUIT AND OPTICAL NODE EQUIPMENT

(75) Inventor: Takeshi Hoshida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 68 days.

(21) Appl. No.: 13/447,767

(22) Filed: Apr. 16, 2012

(65) Prior Publication Data

US 2012/0328297 A1  Dec. 27, 2012

(30) Foreign Application Priority Data

Jun. 27, 2011 (JP) ................. 2011-141670

(51) Int. Cl.
H04J 14/02 (2006.01)
H04B 10/077 (2013.01)

(52) U.S. Cl.
CPC ............. *H04J 14/02* (2013.01); *H04J 14/0204* (2013.01); *H04J 14/0205* (2013.01); *H04J 14/0212* (2013.01); *H04J 14/0257* (2013.01); *H04J 14/0258* (2013.01); *H04J 14/0276* (2013.01); *H04J 14/0264* (2013.01); *H04B 10/0773* (2013.01); *H04B 2210/074* (2013.01)

(58) Field of Classification Search
CPC .................................................. H04J 14/0276
USPC .............. 398/32, 83–85, 16, 25, 30, 33
See application file for complete search history.

(56) References Cited

U.S. PATENT DOCUMENTS

| | | | |
|---|---|---|---|
| 6,493,117 B1 | 12/2002 | Milton et al. | |
| 6,556,321 B1 | 4/2003 | Milton et al. | |
| 6,631,018 B1 | 10/2003 | Milton et al. | |
| 6,943,925 B1 * | 9/2005 | Islam | 359/108 |
| 7,062,166 B2 * | 6/2006 | Jacobowitz et al. | 398/32 |
| 7,444,079 B2 * | 10/2008 | DeCusatis et al. | 398/93 |
| 7,512,342 B1 | 3/2009 | Feuer et al. | |
| 7,580,632 B1 | 8/2009 | Feuer et al. | |
| 8,441,726 B2 * | 5/2013 | Sakurai | 359/559 |
| 2002/0191904 A1 * | 12/2002 | Kani et al. | 385/24 |

(Continued)

FOREIGN PATENT DOCUMENTS

| | | |
|---|---|---|
| JP | 10-229384 | 8/1998 |
| JP | 11-331224 | 11/1999 |
| JP | 2008-263590 | 10/2008 |

OTHER PUBLICATIONS

Vinay A. Vaishampayan et al., "An Overlay Architecture for Managing Lightpaths in Optically Routed Networks," IEEE Transactions on Communications, vol. 53, No. 10, pp. 1729-1737 (Oct. 2005).

(Continued)

*Primary Examiner* — David Payne
*Assistant Examiner* — Casey Kretzer
(74) *Attorney, Agent, or Firm* — Fujitsu Patent Center

(57) ABSTRACT

A superimposed signal detection circuit detects a signal superimposed on an optical signal in a WDM system. The superimposed signal detection circuit includes: an optical filter having wavelength-dependent loss to filter a plurality of optical signals on which a corresponding superimposed signal is superimposed by frequency modulation; a photo detector to convert the plurality of optical signals filtered by the optical filter into an electric signal; and a detector to obtain information indicated by the superimposed signal respectively superimposed on the plurality of optical signals from the electric signal obtained by the photo detector.

14 Claims, 17 Drawing Sheets

(56) References Cited

U.S. PATENT DOCUMENTS

| | | | |
|---|---|---|---|
| 2003/0072051 A1* | 4/2003 | Myers et al. | 359/115 |
| 2005/0249505 A1* | 11/2005 | Manderscheid et al. | 398/177 |
| 2006/0110162 A1* | 5/2006 | Tian et al. | 398/83 |
| 2008/0044122 A1* | 2/2008 | Fondeur et al. | 385/1 |
| 2008/0232816 A1 | 9/2008 | Hoshida et al. | |
| 2009/0169210 A1 | 7/2009 | Feuer et al. | |
| 2009/0269080 A1* | 10/2009 | Akiyam et al. | 398/188 |
| 2009/0324219 A1* | 12/2009 | Jiang et al. | 398/34 |
| 2010/0080568 A1 | 4/2010 | Feuer et al. | |
| 2011/0170857 A1* | 7/2011 | Fee et al. | 398/19 |

OTHER PUBLICATIONS

JPOA—Office Action of Japanese Patent Application No. 2011-141670, dated Apr. 21, 2015 with partial English translation.

* cited by examiner

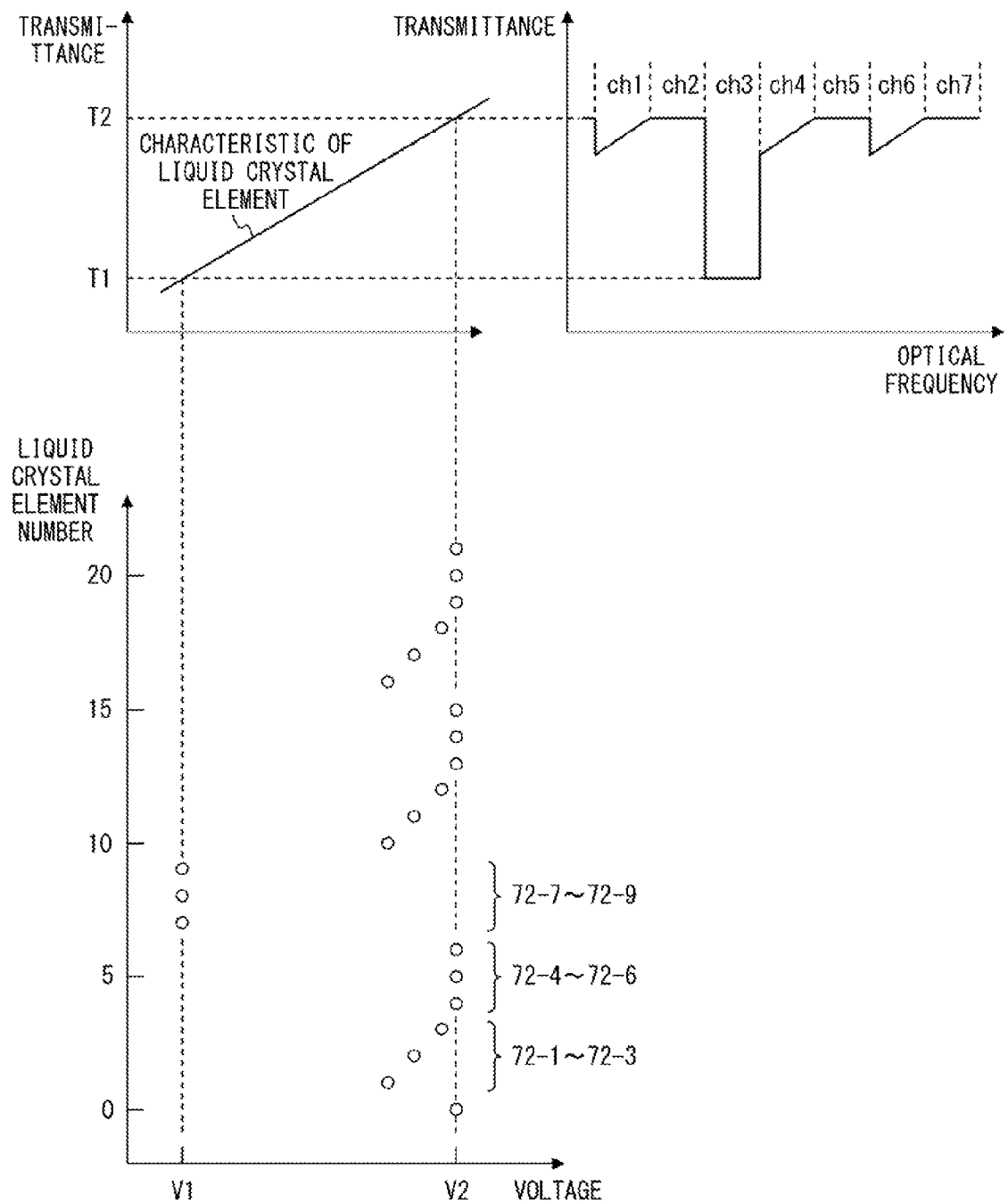
F I G. 13

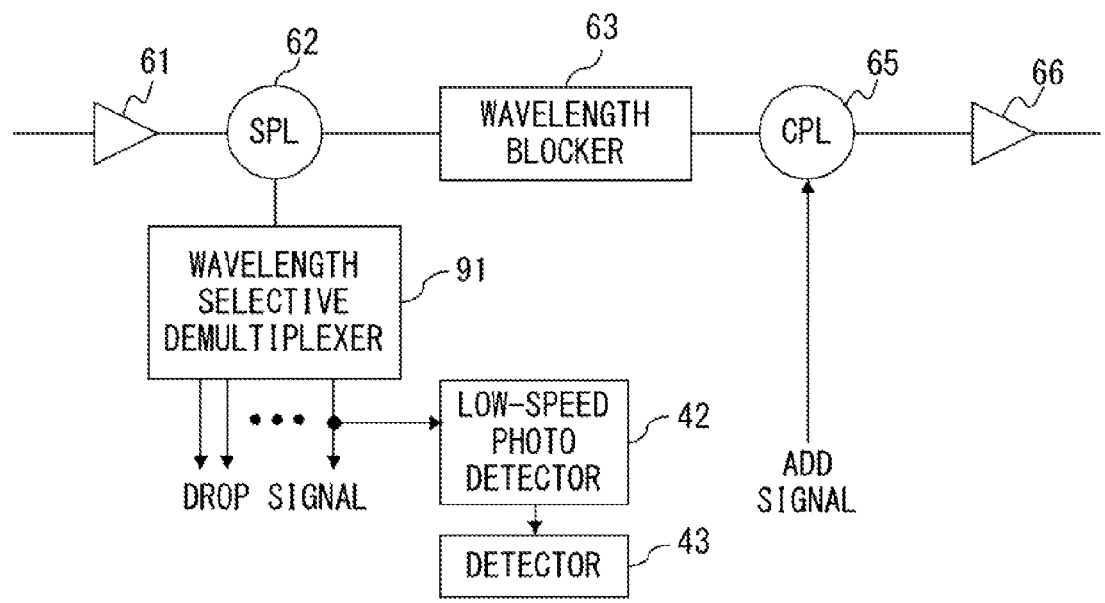
F I G. 1 6 A
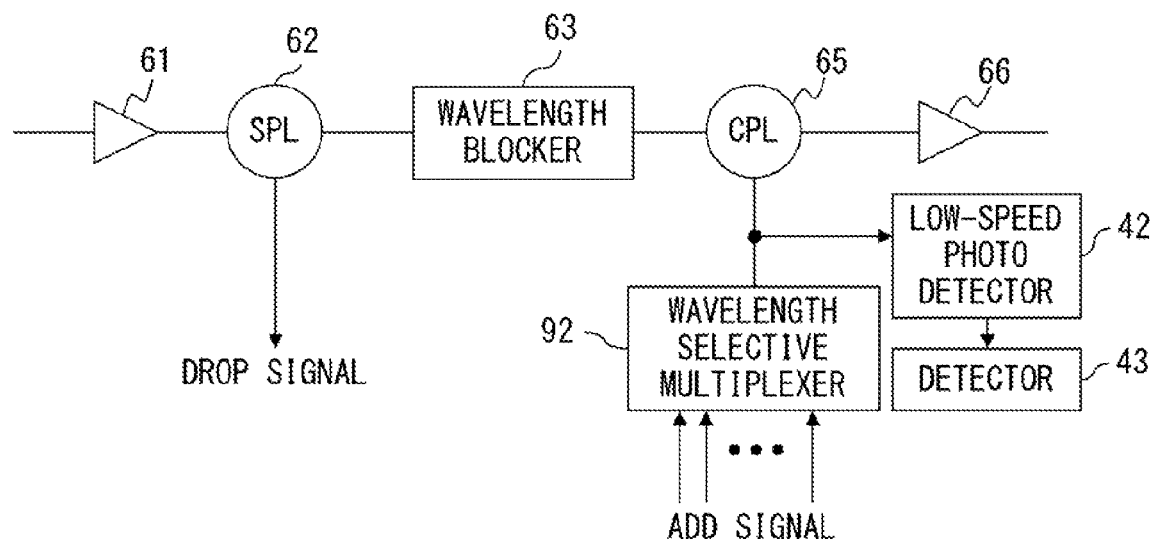
F I G. 1 6 B

SUPERIMPOSED SIGNAL DETECTION CIRCUIT AND OPTICAL NODE EQUIPMENT

CROSS-REFERENCE TO RELATED APPLICATION

This application is based upon and claims the benefit of priority of the prior Japanese Patent Application No. 2011-141670, filed on Jun. 27, 2011, the entire contents of which are incorporated herein by reference.

FIELD

The embodiments described herein are related to a superimposed signal detection circuit to detect a signal superimposed on an optical signal, and an optical node equipment having a function to detect a superimposed signal.

BACKGROUND

A photonic network having an optical add-drop multiplexer and/or a wavelength crossconnect has been proposed and developed. The optical add-drop multiplexer (ROADM: Reconfigurable Optical Add/Drop Multiplexer) is capable of dropping an optical signal of a desired wavelength from a WDM optical signal and guiding the dropped signal to a client, and capable of adding a client signal of any wavelength to a WDM optical signal. The wavelength crossconnect (WXC: Wavelength Cross Connect or PXC: Photonic Cross Connect) is capable of controlling the route of an optical signal for each wavelength, without converting the optical signal into an electric signal.

In a photonic network as described above, a plurality of optical paths (here, wavelength paths) that use the same wavelength may be set. For this reason, in order to establish and operate a network certainly, for example, a scheme to superimpose a path ID to identify each optical path on an optical signal has been proposed. In this case, optical node equipment (here, the optical add-drop multiplexer, the wavelength crossconnect and the like) has a function to detect the path ID superimposed on the optical signal. Accordingly, since each optical path can be identified certainly at the optical node equipment, it becomes possible to monitor/detect/avoid a failure such as to connect the optical fiber to a wrong port, and so on.

As a technique to manage the optical path, a method having the following steps has been proposed. The steps includes combining at least one payload data stream with at least one side data stream comprising the path ID into a composite electrical data stream; applying the composite data stream to an optical transmitter to produce an optical signal; detecting the optical signal with an optical receiver having a maximum frequency of operation less than one-half of the rate of the composite data stream; and recovering the side data stream from the electrical output of the optical receiver. (for example, U.S. Pat. No. 7,580,632).

In addition, related arts are described in U.S. Pat. No. 7,512,342, US Patent Publication No. 2009/0169210, US Patent Publication No. 2010/0080568, Japanese Laid-open Patent Publication No. H11-331224, Japanese Laid-open Patent Publication No. 2008-263590, Vinay A. Vaishampayan and Mark D. Feuer, "An Overlay Architecture for Managing Lightpaths in Optically Routed Networks," IEEE Transactions on Communications, Vol. 53, No. 10, October 2005.

In a conventional art (for example, FIG. 2 and FIG. 3a in U.S. Pat. No. 7,580,632 and the like), the signal representing the path ID (hereinafter, a path ID signal) is superimposed on the optical signal by, for example, intensity modulation. In this case, cross gain modulation occurs by an optical amplifier that amplifies the WDM optical signal collectively (for example, EDFA) and/or by induced Raman scattering in the optical fiber. The cross gain modulation may induce crosstalk of the path ID signal between wavelength channels in the WDM optical signal. As a result the path ID may be identified wrongly in the optical node equipment.

In another conventional art, after modulating a data signal using a code corresponding to the path ID in the electric domain, an optical signal is generated by optical modulation by the modulated data signal. In this case, for the optical receiver, an optical demodulator corresponding to the optical modulation scheme needs to be provided on the input side of a converter to convert the optical signal into the electric signal. Therefore, in a system in which a plurality of optical modulation schemes are used, a plurality of optical modulators need to be provided, increasing the circuit size. In addition, when the payload data have different symbol rates, it is difficult to collectively adjust the clocks of respective wavelength channels.

SUMMARY

According to an aspect of the invention, a superimposed signal detection circuit that detects a signal superimposed on an optical signal in a WDM system. The superimposed signal detection circuit includes: an optical filter having wavelength-dependent loss to filter a plurality of optical signals on which a corresponding superimposed signal is superimposed by frequency modulation; a photo detector to convert the plurality of optical signals filtered by the optical filter into an electric signal; and a detector to obtain information indicated by the superimposed signal respectively superimposed on the plurality of optical signals from the electric signal obtained by the photo detector.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 is a diagram illustrating the operation of a wavelength block.

FIG. 16A and FIG. 16B are diagrams illustrating an example of another configuration to realize a superimposed signal detection circuit in a ROADM.

DESCRIPTION OF EMBODIMENTS

Figure 1:
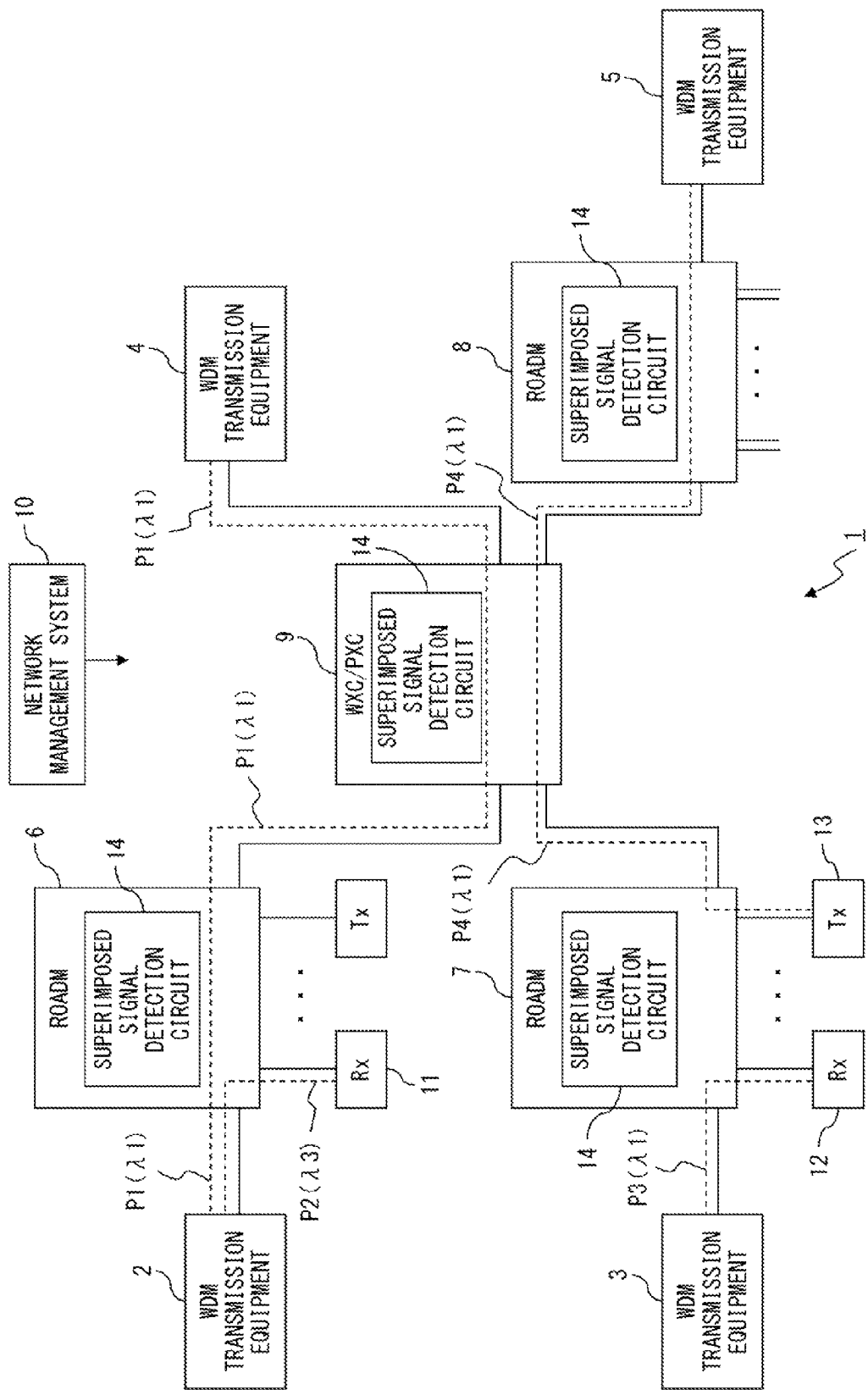
FIG. 1 is a diagram illustrating an example of an optical transmission system in which a superimposed signal detection circuit of an embodiment is used.

FIG. 1 illustrates an example of an optical transmission system in which a superimposed signal detection circuit of an embodiment of the present invention is used. The optical transmission system illustrated in FIG. 1 has WDM transmission equipments 2-5, optical add-drop multiplexers (ROADM: Reconfigurable Optical Add/Drop Multiplexer) 6-8, a wavelength crossconnect (WXC: Wavelength Cross Connect or PXC Photonic Cross Connect) 9, and a network management system (NMS) 10.

The WDM transmission equipments 2, 3, 5 are connected to the optical add-drop multiplexers 6, 7, 8, respectively, via a corresponding optical fiber line. The optical add-drop multiplexers 6, 7, 8 are connected to the wavelength crossconnect 9, respectively, via a corresponding optical fiber line. One or a plurality of optical amplifiers may be provided on each optical fiber line.

Each of the WDM transmission equipments 2-5 transmits and receives a WDM optical signal including a plurality of optical signals of different wavelengths. Each of the optical add-drop multiplexers 6-8 drops an optical signal of a specified wavelength from an input WDM optical signal and guides the dropped signal to a client line. In addition, each of the optical add-drop multiplexers 6-8 adds an optical signal input from a client line to a WDM optical signal. The wavelength crossconnect 9 has a plurality of input ports and a plurality of output ports, and guides an input signal to a corresponding output port so as to realize a specified optical path. While it is not explicitly illustrated, the wavelength crossconnect 9 may also have a function for dropping a signal from a WDM optical signal to a client circuit and for adding a client signal to a WDM optical signal.

The network management system 10 sets an optical path specified by a user in the optical transmission system 1. In other words, the network management system 10 controls the WDM transmission equipments 2-5, the optical add-drop multiplexers 6-8 and the wavelength crossconnect 9 so as to realize an optical path specified by the user. The network management system 10 may be in a configuration to establish a so-called management plane by a centralized control system, or may be in a configuration to establish a so-called control plane by a distributed control system, or, may be a system being a combination of them.

In the example illustrated in FIG. 1, optical paths P1-P4 are set in the optical transmission system 1. Each optical path is indicated by a broken line. The optical path 1 carries an optical signal from the WDM transmission equipment 2 to the WDM transmission equipment 4 via the optical add-drop multiplexer 6 and the wavelength crossconnect 9. The optical path 2 carries an optical signal from the WDM transmission equipment 2 to a client 11 via the optical add-drop multiplexer 6. The optical path 3 carries an optical signal from the WDM transmission equipment 3 to a client 12 via the optical add-drop multiplexer 7. The optical path P4 carries an optical signal from a client 13 to the WDM transmission equipment 5 via the optical add-drop multiplexer 7, the wavelength crossconnect 9 and the optical add-drop multiplexer 8. Each of the optical paths P1-P4 may carry optical signal in both directions.

In the optical transmission system 1, the network management system 10 may assign the same wavelength to different optical paths, to utilize the communication resource efficiently or flexibly. In the example illustrated in FIG. 1, wavelengths $\lambda 1, \lambda 3, \lambda 1, \lambda 1$ are assigned to the optical paths P1, P2, P3, P4, respectively.

The user or the network administrator may wish to check whether the optical paths are set correctly. However, when the same wavelength is assigned to a plurality of optical paths, it is difficult to identify each optical path only by monitoring the spectrum of each wavelength channel. For example, at the wavelength crossconnect 9, it is difficult to identify the optical paths P1, P4 only by monitoring the spectrum of each wavelength.

Therefore, the network management system 10 assigns a path ID to each optical path. The transmitting source equipment of an optical path superimposes a path ID signal that represents the path ID on an optical signal to be transmitted. For example, the WDM transmission equipment 2 superimposes a path ID signal that represents "path ID=1" on an optical signal to be transmitted via the optical path 1, and superimposes a path ID signal representing "path ID=2" on an optical signal to be transmitted via the optical path 2.

The optical node equipment has a superimposed signal detection circuit 14 to detect the path ID signal superimposed on the optical signal and to obtain the path ID. The optical node equipment corresponds to the optical add-drop multiplexer 6-8 and the wavelength crossconnect 9. However, the superimposed signal detection circuit 14 does not have to be provided for all of the optical node equipments, and a plurality of superimposed signal detection circuits 14 may be provided for one optical node equipment. In addition, the superimposed signal detection circuit 14 may be built within the optical node equipment, or may be connected to the optical node equipment. The superimposed signal detection circuit 14 may also be provided for the WDM transmission equipment 2-5.

Figure 2:
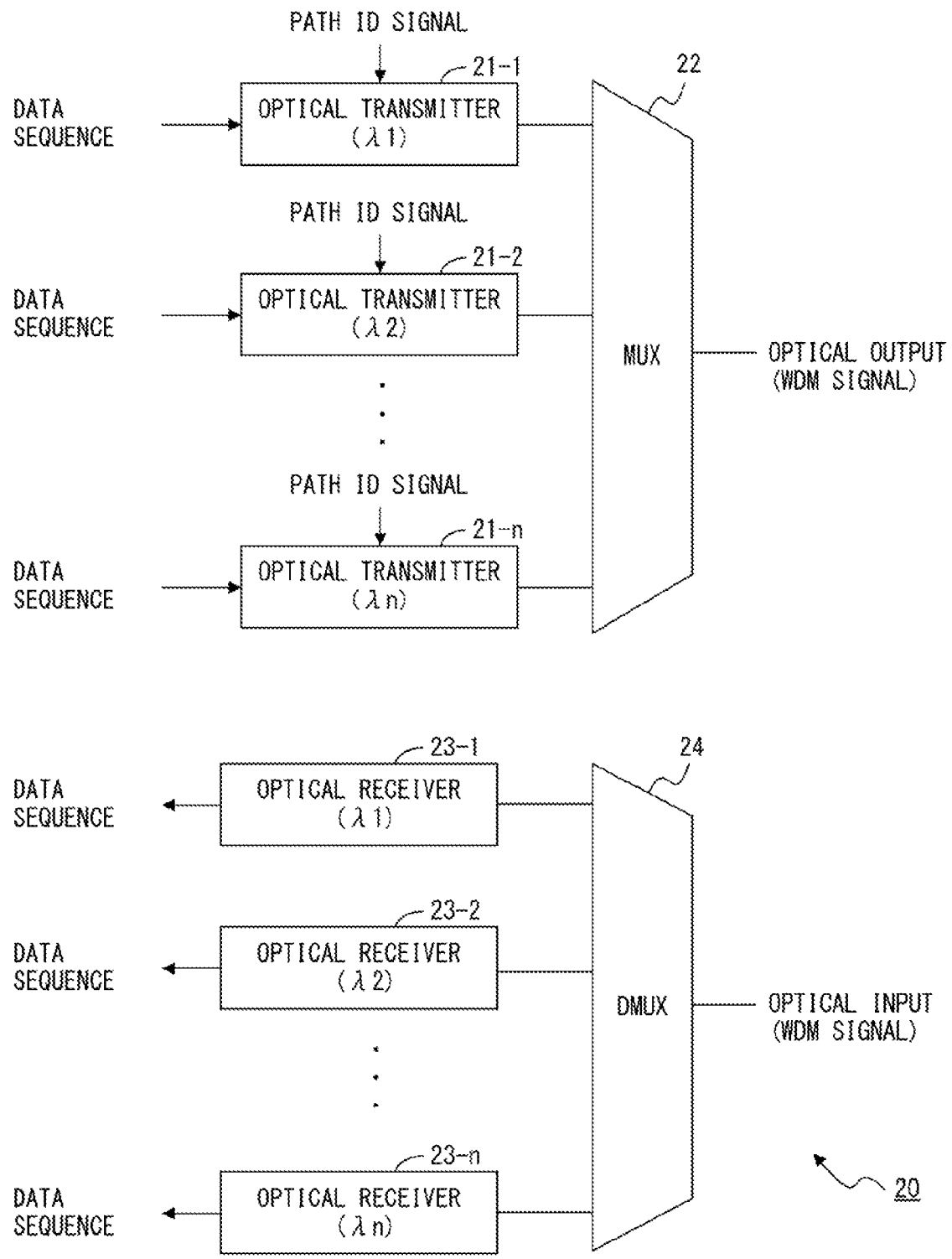
FIG. 2 is a diagram illustrating the configuration of WDM transmission equipment.

FIG. 2 illustrates the configuration of the WDM transmission equipment. A WDM transmission equipment 20 illustrated in FIG. 2 corresponds to the WDM transmission equipment 2-5 in the example illustrated in FIG. 1. The WDM transmission equipment 20 has optical transmitters 21-1 through 21-$n$, a multiplexer (MUX) 22, optical receivers 23-1 through 23-$n$ and a demultiplexer (DMUX) 24.

Each of the optical transmitters 21-1 through 21-$n$ generates an optical signal by modulating carrier light by input data sequence. Here, wavelengths $\lambda 1$ through $\lambda n$ (that is, optical frequencies) of the carrier light that the optical transmitters 21-1 through 21-$n$ use are different from each other. To the optical transmitters 21-1 through 21-$n$ that transmit the optical signal, a path ID is assigned by the network management system 10. The path ID is given to the corresponding optical transmitters 21-1 through 21-$n$ as a path ID signal. The path ID signal is, for example, a code of a specified length. In this case, the codes to identify the respective optical paths are orthogonal to each other. In addition, the path ID signals may be tone signals of different frequencies from each other. The tone signal is, for example, a sine wave signal, while there is no particular limitation. The rate of the path ID signal (the bit rate of the code, the frequency of the tone signal) is sufficiently low compared with the rate of the data sequence.

The optical transmitters 21-1 through 21-n superimpose the path ID signal on the optical signal by frequency modulation. In other words, the optical transmitters 21-1 through 21-n outputs an optical signal on which the path ID signal is superimposed by frequency modulation. The multiplexer 22 multiplexes optical signals output from the optical transmitters 21-1 through 21-n to generate a WDM optical signal.

The modulation scheme of the data sequence by the optical transmitters 21-1 through 21-n does not have to be the same as each other. For example, the optical transmitter 21-1 may transmit a QPSK modulated optical signal, while the optical transmitter 21-1 may transmit a 16QAM modulated optical signal. In addition, the symbol rate or the bit rate of optical signals output from the optical transmitters 21-1 through 21-n does not have to be the same as each other.

The demultiplexer 24 demultiplexes a received WDM optical signal to output optical signals to the optical receivers 23-1 through 23-n. The optical receivers 23-1 through 23-n respectively demodulate the optical signals to recover data sequence transmitted from a corresponding transmitter.

Figure 3A:
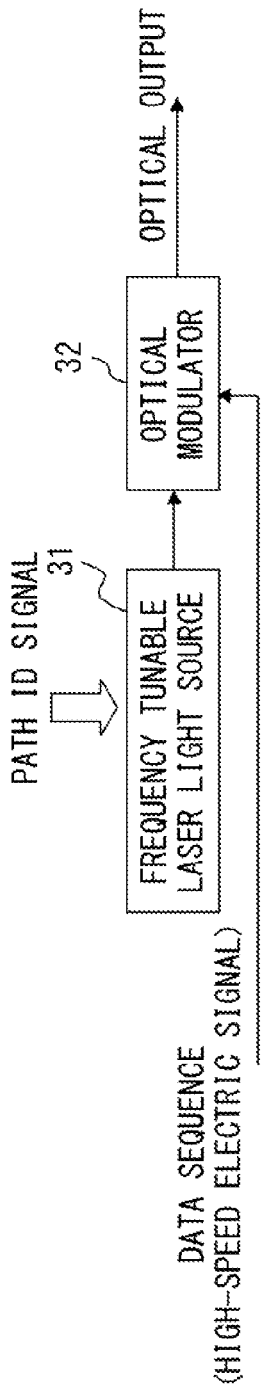
FIG. 3A and FIG. 3B are diagrams illustrating the configuration of an optical transmitter having a function to superimpose a path ID signal.
Figure 3B:
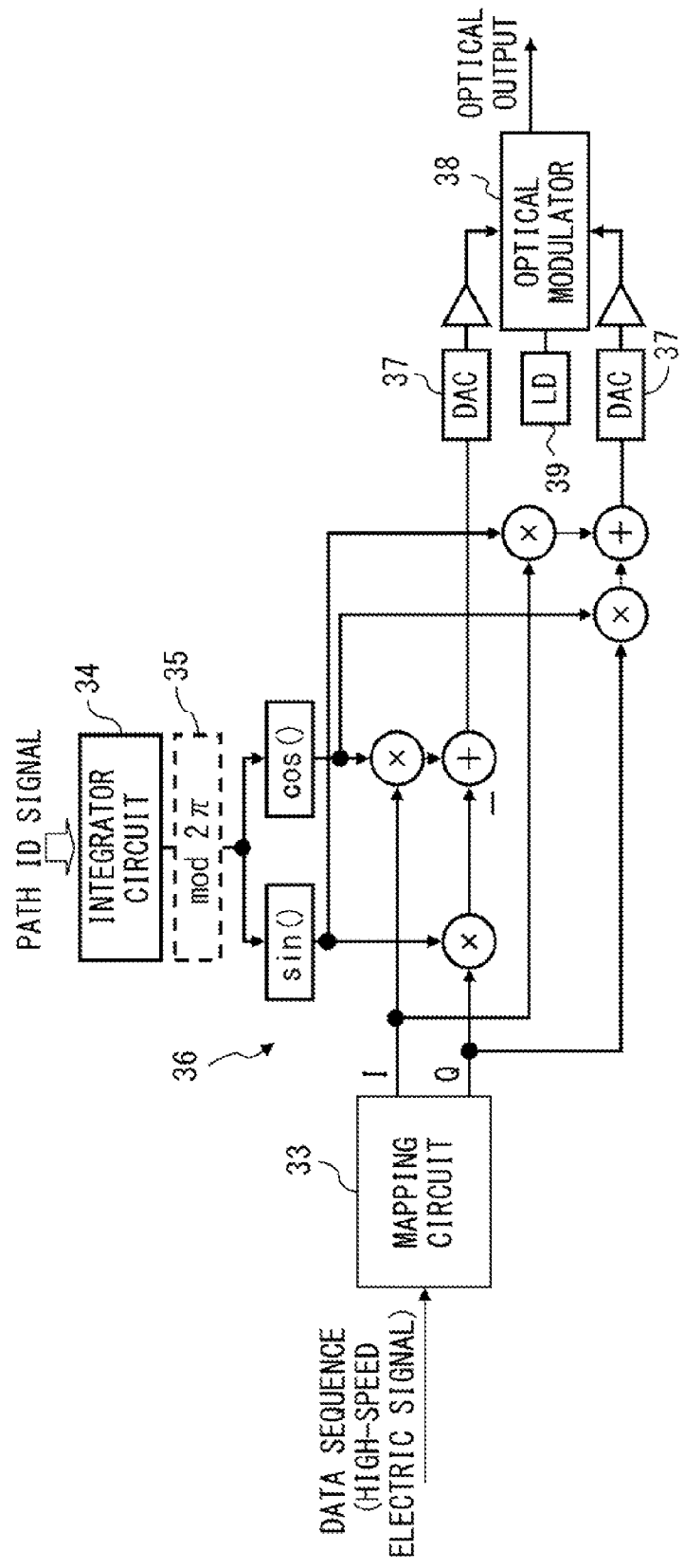

FIG. 3A and FIG. 3B illustrate the configuration of the optical transmitter having a function to superimpose the path ID signal. The optical transmitter illustrated in FIG. 3A and FIG. 3B is an example of the optical transmitters 21-1 through 21-n illustrated in FIG. 2. However, the configuration to superimpose the path ID signal on an optical signal by frequency modulation is not limited to the configuration or the method illustrated in FIG. 3A and FIG. 3B.

The optical transmitter illustrated in FIG. 3A has a frequency tunable laser light source 31 and an optical modulator 32. The frequency tunable laser light source 31 generates continuous wave light of an oscillation frequency based on a frequency control signal. Therefore, by giving the path ID signal as a frequency control signal, the frequency tunable laser light source 31 can generate continuous wave light of an oscillation frequency according to the path ID signal. The optical modulator 32 modulates the continuous wave light generated by the frequency tunable laser light source 31 by the data sequence. As a result, an optical signal on which the path ID signal is superimposed by frequency modulation is generated.

The optical transmitter illustrated in FIG. 3B realizes the frequency modulation superimposition by a digital signal processing. A mapping circuit 33 maps the data sequence into an I component data sequence and a Q component data sequence. An integrator circuit 34 integrates the path ID signal. In the configuration illustrated in FIG. 3B, the path ID signal f(t) is a digital data sequence representing an amplitude-time waveform of a code or a tone signal. The integrator circuit 34 outputs phase information θ(t) described below as the result of the integration.

$$\theta(t) = \int 2\pi f(t) dt$$

A mod $2\pi$ circuit 35 converts the output value of the integrator circuit 34 into a value within a range from zero to $2\pi$. However, when the value range of the integrator circuit 34 is designed to be from zero to $2\pi$, the mod $2\pi$ circuit 35 may be omitted.

A rotation operation circuit 36 rotates the I component data sequence and the Q component data sequence using the phase information θ(t) by the operation below, where I, Q are input data of the rotation operation circuit 36 and I', Q' are output data of the rotation operation circuit 36.

$$I' = I \cos \theta(t) - Q \sin \theta(t)$$

$$Q' = I \sin \theta(t) + Q \cos \theta(t)$$

The data I' and the data Q' obtained by the rotation operation circuit 36 are respectively converted into an analog signal by a D/A converter 37 and given to the optical modulator 38. The optical modulator 38 generates a modulated optical signal by modulating the continuous wave light output from the laser light source 39 by the data I' and the data Q'. As a result, an optical signal on which the path ID signal is superimposed by frequency modulation is generated. When the limitation of frequency bandwidth, the frequency characteristic ripple, nonlinear response, delay difference (skew) are not negligible as the analog characteristic of the D/A converter 37, the optical modulator 38 and the connection line between them, they may be corrected by providing a digital signal processor having opposite characteristics to them at the input side of the D/A converter 37.

Figure 4:
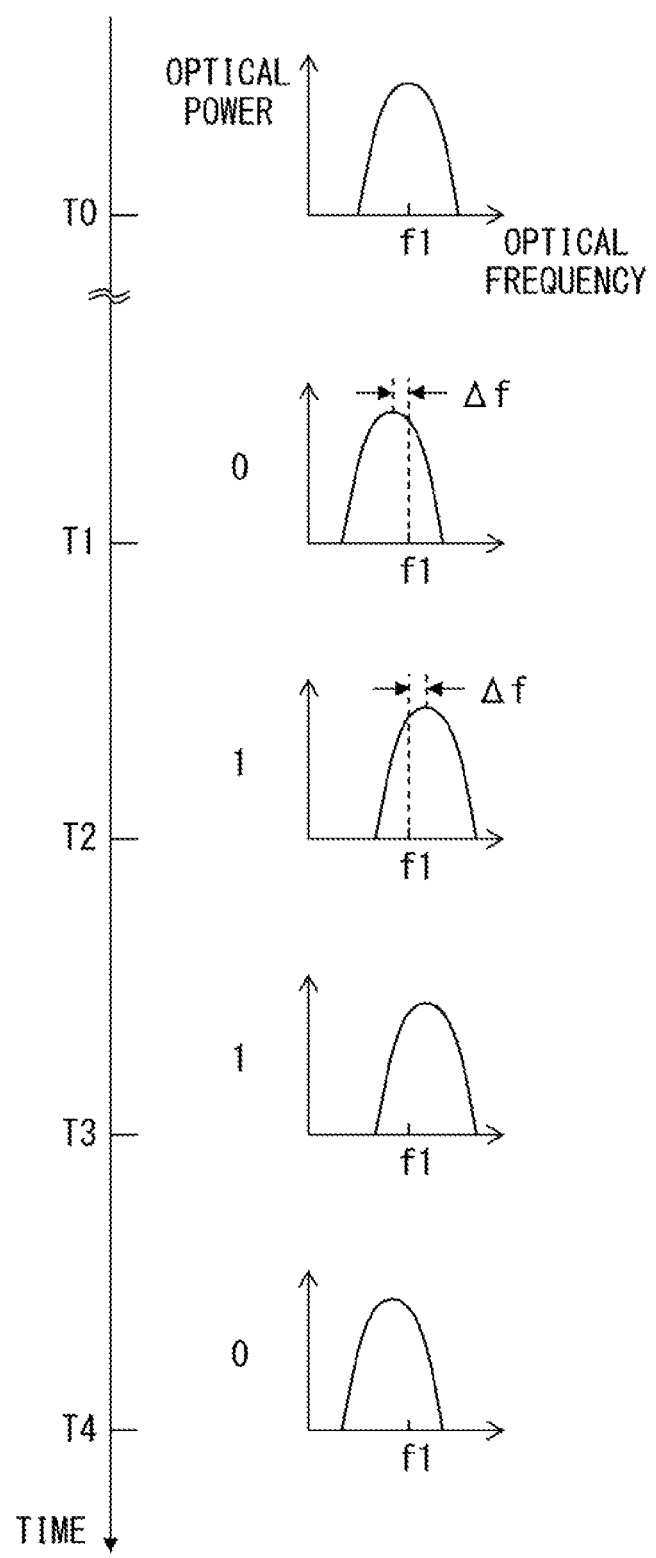
FIG. 4 is a diagram illustrating frequency modulation superimposition.

FIG. 4 is a diagram explaining the frequency modulation superimposition. FIG. 4 illustrates the time resolved output spectrum of the optical transmitter at time T0, T1-T4. The spread of the output spectrum at each time represents the spectrum spread generated according to the high speed modulation by the data sequence, and may take various widths and forms according to the modulation scheme and the modulation speed of the optical signal. On the optical signal output from the optical transmitter, as explained with reference to FIG. 3A and FIG. 3B, the path ID signal is superimposed by frequency modulation. In the example illustrated in FIG. 4, the path ID signal is a digital code, and it is assumed that the path ID code superimposed on the optical signal at the time T1-T4 is "0110". In addition, it is assumed that the center frequency of carrier light used by the optical transmitter is f1.

At the time T0, the path ID code is not superimposed on the optical signal. In this case, the optical transmitter does not shift the frequency of the optical signal. Therefore, the center of the spectrum of the optical signal output at the time T0 is f1.

At the time T1, "0" is superimposed on the optical signal. In this embodiment, the optical transmitter shifts the frequency of the optical signal by −Δf. Therefore, the center of the spectrum of the optical signal output at the time T1 is f1−Δf.

At the time T2, "1" is superimposed on the optical signal. In this case, in this embodiment, the optical transmitter shifts the frequency of the optical signal by +Δf. Therefore, the center of the spectrum of the optical signal output at the time T2 is f1+Δf. In the same manner, the center of the spectrum of the optical signal output at the T3 is f1+Δf, and the center of the spectrum of the optical signal output at the time T4 is f1−Δf.

The frequency shift Δf is sufficiently small compared with the frequency of the carrier light. In addition, Δf is determined to avoid ICI (inter channel interference) in the WDM transmission system. For example, in a WDM transmission system in which the wavelength channel is arranged on the 50 GHz/100 GHz frequency grid recommended by ITU-T, appropriate Δf is about 1 MHz-1 GHz, while this is not a particular limitation. When Δf is too small, the frequency fluctuation (laser line width) of the carrier light becomes normegligible as noise, and the detection sensitivity of the superimposed signal at the superimposed signal detection circuit becomes low. Therefore, it is preferable to determine Δf in consideration of the interference with adjacent channels and the detection sensitivity.

While the frequency shift when the superimposed signal is "0" and "1" is "−Δf" and "+Δf" respectively in the example illustrated in FIG. 4, the present embodiment is not limited to this scheme. For example, the frequency shift when the superimposed signal is "0" and "1" may be "+Δf" and "−Δf" respectively. In addition, the frequency shift may be zero when the superimposed signal is "0 (or, 1)", and the optical frequency may be shifted when the superimposed signal is "1 (or, 0)". Furthermore, as 4-level frequency shift keying, for example, the frequency shift when two bits of the superimposed signal is "00", "01", "10" and "11" may be "−Δf", "−0.5Δf", "+0.5Δf" and "+Δf", respectively. Furthermore, the superimposed signal may be modulated using multi-level frequency shift keying other than binary or 4-level.

While the path ID signal is a digital signal in the example illustrated in FIG. 4, the method to shift the optical frequency is substantially the same in the case in which the path ID signal is an analog signal. However, when the path ID signal is an analog signal, the amount of frequency shift changes continuously (not discretely).

Figure 5:
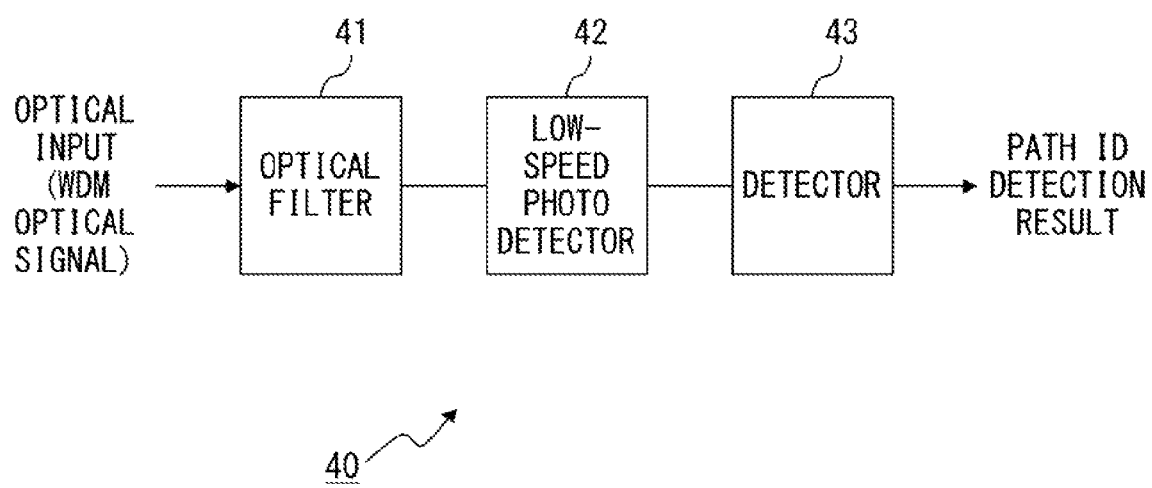
FIG. 5 is a diagram illustrating a superimposed signal detection circuit of the embodiment.

FIG. 5 illustrates the configuration of a superimposed signal detection circuit. A superimposed signal detection circuit 40 of the embodiment has an optical filter 41, a low-speed photo detector 42, and a detector 43. The superimposed signal detection circuit 40 corresponds to the superimposed signal detection circuit 14 provided in the optical node equipment, in the optical transmission system illustrated in FIG. 1.

The optical filter 41 filters an input optical signal. The transmittance (or, loss) of the optical filter 41 depends on the wavelength (or optical frequency) of the optical signal. That is, the optical filter 41 is a wavelength-dependent loss optical filter. In other word, the optical filter 41 is a wavelength-dependent transmittance optical filter.

The low-speed photo detector 42 includes a photo diode for example, and outputs an optical current corresponding to the intensity of the input optical signal. That is, the low-speed photo detector 42 converts the optical signal filtered by the optical filter 41 into an electric signal. The bandwidth of the optical detector 42 is assumed to be lower than the symbol rate of the data signal carried by the optical signal. While there is no particular limitation, for example, the bandwidth of the low-speed photo detector 42 may be lower than or equal to 1% of the symbol rate of the data signal carried by the signal. Therefore, the data signal is averaged at the low-speed photo detector 42. However, the bandwidth of the low-speed photo detector 42 is supposed to be sufficiently high with respect to the purpose of realizing the demodulation of the path ID signal superimposed on the optical signal. While there is no particular limitation, for example, the bandwidth of the low-speed photo detector 42 may be lower than or equal to 1 percent of the symbol rate of the data signal carried by the signal and higher than or equal to 0.5 times the frequency modulation rate of the path ID signal.

The detector 43 detects the path ID signal from the electric signal obtained by the low-speed photo detector 42, and obtains the path ID. When a WDM optical signal including a plurality of optical signals is input to the superimposed signal detection circuit 40, the detector 43 detects path ID signals respectively superimposed on the optical signals, and obtains each path ID. That is, the detector 43 is capable of identifying the path ID superimposed on the optical signal at the optical transmitter. The detector 43 may detect the path ID signals respectively superimposed on a plurality of optical signals collectively and simultaneously. The detector 43 may be configured to perform presence/absence judgment as to whether or not an expected path ID has been superimposed on the optical signal, and to output the presence/absence judgment result.

Figure 6:
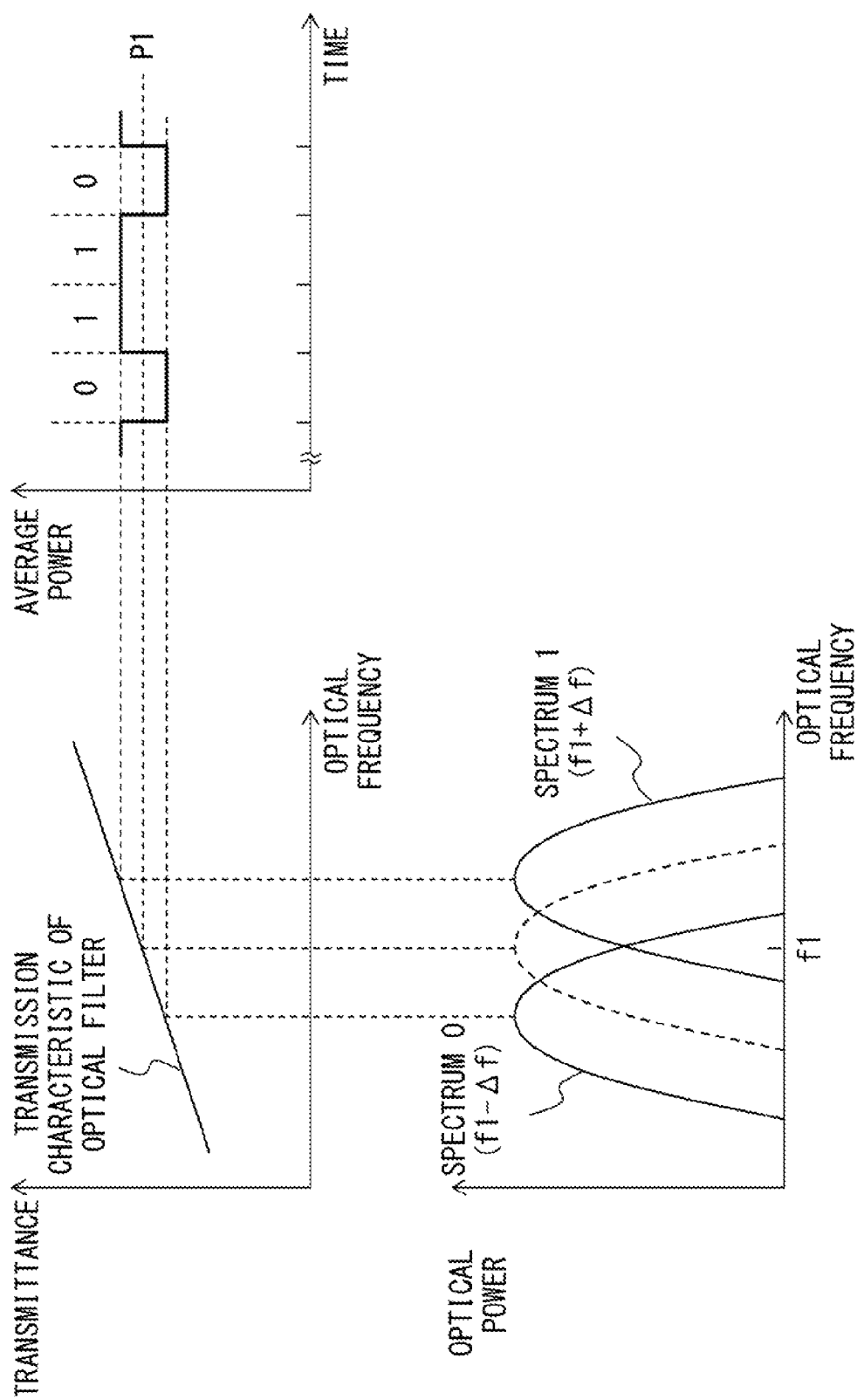
FIG. 6 is a diagram illustrating an operation of an optical filter and a low-speed photo detector.

FIG. 6 is a diagram illustrating the operation of the optical filter 41 and the low-speed photo detector 42. FIG. 6 includes a diagram illustrating the spectrum of the optical signal, a diagram illustrating the characteristics of the optical filter 41, and a diagram illustrating the average power of the output light of the optical filter 41.

The spectrum 0 is the spectrum of the optical signal when the superimposed signal is "0", and the center frequency of the spectrum 0 is f1−Δf. The spectrum 1 is the spectrum of the optical signal when the superimposed signal is "1", and the center frequency of the spectrum 1 is f1+Δf. The spectrum presented by the broken line indicates the state where no superimposed signal is given, and the center frequency is f1.

The transmittance of the optical filter 41 depends on the wavelength (or optical frequency) of the optical signal as described above. In the example illustrated in FIG. 6, the optical filter 41 is designed so that the transmittance increases as the optical frequency becomes higher, and the transmittance decreases as the optical frequency becomes lower, in the frequency area around f1.

Here, it is assumed that when an optical signal on which the path ID signal is not superimposed (that is, the optical signal of the center frequency f1) is input to the optical filter 41, the average output optical power of the optical filter 41 is P1. In this case, when the optical signal on which "0" is superimposed (that is, the optical signal whose center frequency is f1−Δf) is input to the optical filter 41, since the transmittance decreases due to the frequency shift, the average output optical power of the optical filter 41 is smaller than P1. On the other hand, when the optical signal on which "1" is superimposed (that is, the optical signal whose center frequency is f1+Δf) is input to the optical filter 41, since the transmittance increases due to the frequency shift, the average output optical power of the optical filter 41 is larger than P1.

Averaging of the output optical power of the optical filter 41 is realized by the low-speed photo detector 42. That is, the low-speed photo detector 42 generates an electric signal that represents the average optical power of the optical signal filtered by the optical filter 41. For example, when the path ID code "0110" illustrated in FIG. 4 is superimposed on the optical signal, the low-speed photo detector 42 sequentially outputs "0" "1" "1" "0", where "0" corresponds to the state where the optical power represented by the output signal of the low-speed photo detector 42 is smaller than P1, and "1" corresponds to the state where the optical power represented by the output signal of the low-speed photo detector 42 is larger than P1. Thus, the optical filter 41 and the low-speed photo detector 42 are capable of converting the path ID superimposed on the optical signal by frequency modulation at the optical transmitter into an intensity modulated signal.

Figure 7A:
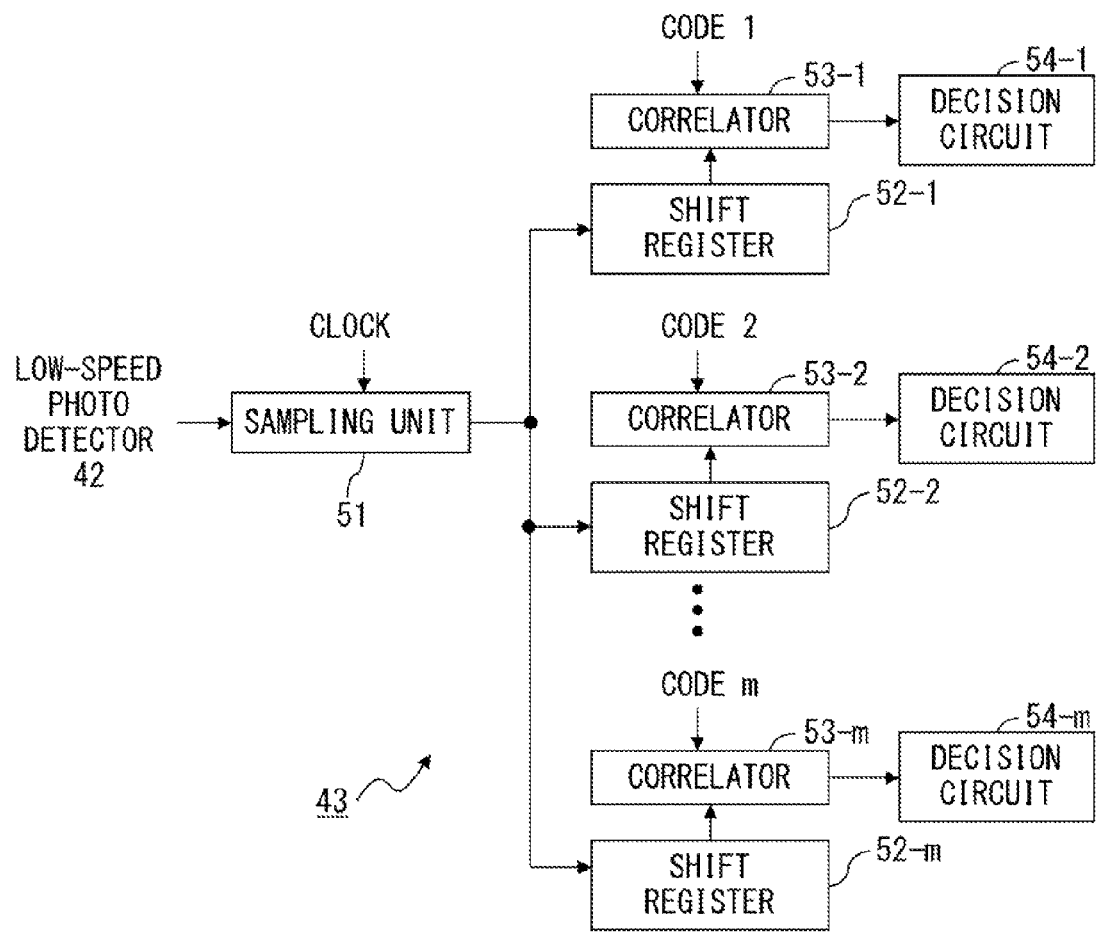
FIG. 7A and FIG. 7B are diagrams illustrating examples of a detector.
Figure 7B:
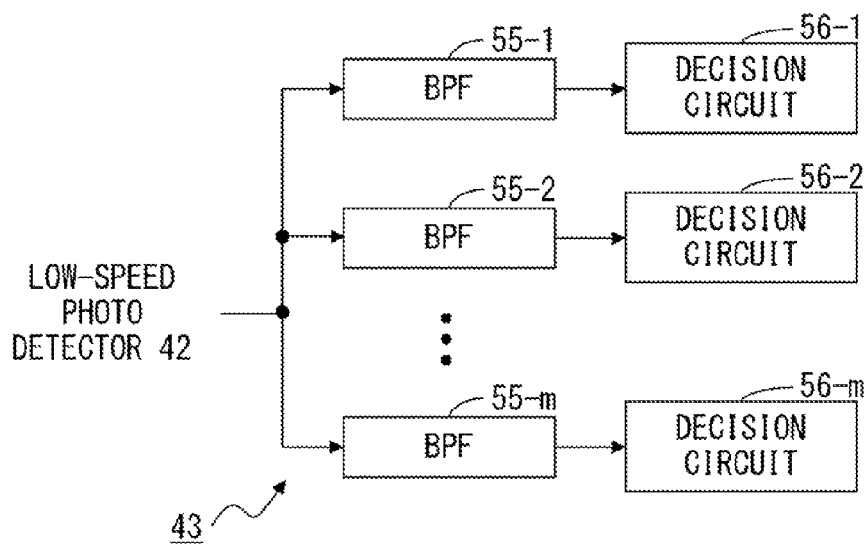

FIG. 7A and FIG. 7B illustrate examples of the detector 43. The detector 43 detects the path ID signal from the electric signal obtained by the low-speed photo detector 42 and obtains the path ID. Here, the superimposed signal detection circuit 40 detects the path ID signals superimposed respectively on a plurality of optical signals included in a WDM optical signal.

FIG. 7A illustrates an example of the detector 43 in a case in which the path ID identifying the optical path is realized by a code. The bit length of the path ID codes representing the path IDs are supposed to be the same as each other. In addition, the WDM optical signal can accommodate n wavelength channels. In this case, the detector 43 has a sampling unit 51, shift registers 52-1 through 52-m, correlators 53-1 through 53-*m*, decision circuits 54-1 through 54-*m*. m is any integer that is equal to or larger than 1, and n and m may be equal to each other.

The sampling unit 51 samples the electric signal output from the low-speed photo detector 42. The frequency of the sampling clock may be the same as the bit rate (or the chip rate) of the path ID code, for example. The sampled data sequence obtained by the sampling unit 51 is guided to the shift registers 52-1 through 52-*m*. The length of the shift registers 52-1 through 52-*m* is the same as the bit length of the path ID code.

To the correlators 53-1 through 53-*m*, corresponding codes 1 through m are given, respectively, The codes 1 through m are given from the network management system 10 illustrated in FIG. 1, for example. In addition, the codes 1 through m are codes expected to be superimposed on the optical signals in the input WDM optical signal. The correlators 53-1 through 53-*m* respectively calculates the correlation of the codes 1 through m and the sampled data sequence held in the shift registers 52-1 through 52-*m*.

The decision circuits 54-1 through 54-*m* respectively compare the correlation value calculated by the correlators 53-1 through 53-*m* and a threshold. Then, the decision circuits 54-1 through 54-*m* judge whether or not the codes 1 through m are detected, based on the result of the comparison. For example, when the correlation value calculated by the correlator 53-1 is higher than the threshold, the decision circuit 54-1 decides that the code 1 is detected from the input WDM optical signal. In this case, the superimposed signal detection circuit 40 decides that the optical path identified by the code 1 has been established in the input WDM optical signal. On the other hand, when the correlation value calculated by the correlator 53-1 is equal to or lower than the threshold, the decision circuit 54-1 decides that the code 1 is not detected from the input WDM optical signal. In this case, the superimposed signal detection circuit 40 decides that the optical path identified by the code 1 has not been established in the input WDM optical signal.

The correlators 53-1 through 53-*m* are capable of calculating the correlation of the corresponding codes 1 through m and the sampled data sequence independently from each other and in parallel. In addition, the decision circuits 54-1 through 54-*m* are capable of comparing the correlation values calculated by the correlators 53-1 through 53-*m* and the threshold independently from each other and in parallel. Therefore, the superimposed signal detection circuit 40 can decide whether or not the codes 1 through m are detected from the input WDM optical signal simultaneously and collectively. That is, the superimposed signal detection circuit 40 is capable of deciding whether or not the optical paths identified by the codes 1 through m are established in the input WDM optical signal simultaneously and collectively.

FIG. 7B illustrates an example of the case in which the path ID identifying the optical path is realized by a tone signal. The frequency of tone signals 1 through m representing the path ID is different from each other. Here, it is supposed that, in the WDM transmission equipment illustrated in FIG. 2, the frequency of the tone signals 1 through m superimposed on each optical signal is $\lambda(t1)$ through $\lambda(tm)$, respectively. In addition, the WDM optical signal can accommodate n wavelength channels. In this case, the detector 43 has bandpass filters 55-1 through 55-*m* and decision circuits 56-1 through 56-*m*.

In the detector 43, the electric signal output from the low-speed photo detector 42 is fed to the bandpass filters 55-1 through 55-*m*. The passing frequency of the bandpass filters 55-1 through 55-*m* are $\lambda(t1)$ through $\lambda(tm)$, respectively.

The decision circuits 56-1 through 56-*m* respectively compare the output level of the bandpass filters 55-1 through 55-*m* with a threshold. The decision circuits 56-1 through 56-*m* judge whether or not the tone signals 1 through m are detected, based on the result of the comparison. For example, when the output level of the bandpass filter 55-1 is higher than the threshold, the decision circuit 56-1 decides that the tone signal 1 is detected from the input WDM optical signal. In this case, the superimposed signal detection circuit 40 decides that the optical path identified by the tone signal 1 has been established in the input WDM optical signal. On the other hand, when the output level of the bandpass filter 55-1 is equal to or lower than the threshold, the decision circuit 56-1 decides that the tone signal 1 is not detected from the input WDM optical signal. In this case, the superimposed signal detection circuit 40 decides that the optical path identified by the tone signal 1 has not been established in the input WDM optical signal.

The bandpass filters 55-1 through 55-*m* are capable of filtering the electric signal output from the low-speed photo detector 42 independently from each other and in parallel. The bandpass filters 55-1 through 55-*m* may be configured so that the center frequency of their passing band is variable. In addition, the decision circuits 56-1 through 56-*m* are capable of comparing the output levels of the bandpass filters 55-1 through 55-*m* with the threshold independently from each other and in parallel. Therefore, superimposed signal detection circuit 40 is capable of deciding whether or not the tone signals 1 through m are detected from the input WDM optical signal collectively and simultaneously. That is, the superimposed signal detection circuit 40 is capable of deciding whether or not the optical paths identified by the tone signals 1 through m are established in the input WDM optical signal collectively and simultaneously. In addition, the bandpass filters 55-1 through 55-*m* and the decision circuit 56-1 through 56-*m* may be configured collectively by a signal processing circuit including an A/D converter, signal buffer memory, and a high-speed Fourier transform circuit.

Thus, the superimposed signal detection circuit of the embodiment is capable of detecting the path ID signal superimposed on an optical signal, without depending on the modulation scheme to carry the data signal. Therefore, for the optical node equipment, there is no need to provide an optical modulation circuit corresponding to the optical modulation scheme to detect the path ID signal from the optical signal. Accordingly, the superimposed signal detection circuit is realized by a simple configuration, and the size becomes small.

Here, the parallel number m for the decision circuits 54-1 through 54-*m* or 56-1 through 56-*m* in the detector 43 may be equal to the maximum number of wavelength channels n that the WDM optical signal can accommodate. According to such a design, it becomes possible to minimize the time required for the decision to confirm that the path ID is detected as expected. Meanwhile, m may be smaller than n. In this case, while the circuit size of the detector 43 may be reduced, in order to confirm that the path ID is detected as expected for all the wavelength channels, decision process is necessary for a plurality of times while sequentially changing the codes input to the correlator 53-1 through 53-*m* or changing the center frequency of the passing band of the bandpass filters 55-1 through 55-*m*, increasing the time required for the decision. In addition, when m is larger than n, while the circuit size of the detector 43 increases, not only the time require for decision to confirm that the path ID is detected as expected may be minimized, but also comparison with a path ID that is not expected to reach the detector may be performed collectively, making it possible to detect the situation of occurrence of a failure due to a connection mistake in the network and the like in detail and in a short time.

Figure 8:
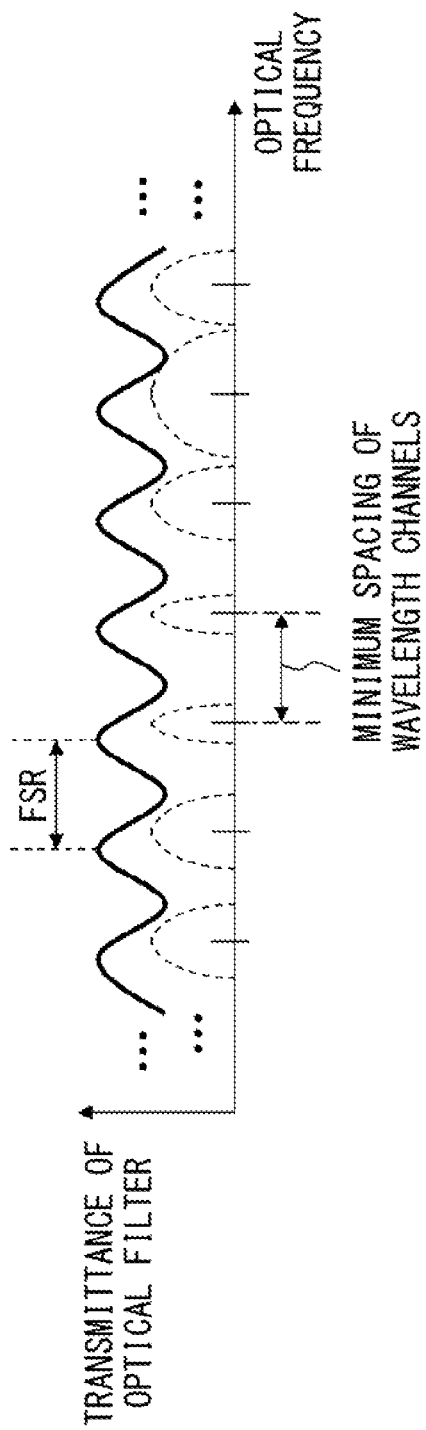
FIG. 8 is a diagram illustrating an example of an optical filter.

FIG. 8 illustrates an example of the optical filter 41. In this example, wavelength channels of the WDM transmission are allocated on a frequency grid of a specified spacing. In the example illustrated in FIG. 8, the wavelength channels are set using optical frequencies f1, f2, f3, . . . . In this case, the minimum spacing of the wavelength channels of the optical transmission system 1 corresponds to the spacing of the frequency grid. For example, when a frequency grid of the 50 GHz spacing is adopted for the optical transmission system 1, the minimum spacing of the wavelength channels of the WDM transmission is also 50 GHz. Meanwhile, in ITU-T Recommendations G.694.1, a frequency grid including 50 GHz spacing and 100 GHz spacing is defined.

FIG. 8 illustrates the spectrum of the optical signal of each wavelength channel. The shape of the spectrum depends on the modulation scheme of the optical signal and the symbol rate of the optical signal. For example, when the symbol rate becomes higher, the width of the spectrum becomes broader. Thus, in the example illustrated in FIG. 8, optical signals of various modulation schemes and/or symbol rates are present.

The optical filter 41 has a characteristic that the transmittance (or, loss) changes periodically with respect to the frequency. At this time, the optical filter 41 is designed to have a free spectral range (FSR) that has a relationship of an integral ratio with respect to the minimum spacing of the wavelength channels of the WDM transmission. That is to say, a relation between a free spectral range of the optical filter 41 and a spacing of wavelength channels of the WDM system may be expressed by a ratio of integers. Preferably, the free spectral range of the optical filter 41 is designed to be a fraction of an integer with respect to the minimum spacing of the wavelength channels of the WDM transmission. In the example illustrated in FIG. 8, the free spectral range of the optical filter 41 is designed to be approximately the same as the minimum spacing of the wavelength channels of the WDM transmission.

In addition, while this is not necessarily optimal, as another example, the free spectral range of the optical filter 41 may be designed to have a value that is not a fraction of an integer with respect to the minimum spacing of the wavelength channels of the WDM transmission but a value that realizes an integral ratio with respect to each other. For example, the free spectral range of the optical filter 41 may be twice the minimum spacing of the wavelength channels of the WDM transmission. In this case, since the sign of the slope of the transmittance of the optical 41 with respect to the frequency grid of even numbers and odd numbers become opposite, it needs to be noted that the polarity of the optical current waveform output from the low-speed photo detector 42 are inverted.

The transmittance of the optical filter 41 periodically repeats peak and bottom (local minimum) with respect to the frequency. At this time, the optical filter 41 is designed so that the frequency grid is located in the area in which the transmittance changes from peak to bottom or in the area in which the transmittance changes from bottom to peak. Preferably, the optical filter 41 is designed so that the frequency grid is located at the midpoint between peak and bottom of the transmittance or its vicinity. By designing the transmittance of the optical filter in this way, the frequency shift of the optical signal is converted into the change of the optical intensity efficiently.

The optical filter whose transmittance periodically changes with respect to the optical frequency is realized by using Fabry-Perot Etalon, for example. With Fabry-Perot Etalon, by designing the thickness and material of etalon appropriately, the period of the change of the transmittance with respect to the optical frequency may be determined arbitrarily, and a desired transmitting center wavelength may be obtained.

The optical filter whose transmittance periodically changes with respect to the optical frequency is not limited to Fabry-Perot Etalon. The optical filter may be realized by an asymmetric Mach-Zehnder interferometer (DLI: Delay Line Interferometer), FBG: Fiber Bragg Grating, superstructure FBG, and so on.

Figure 9:
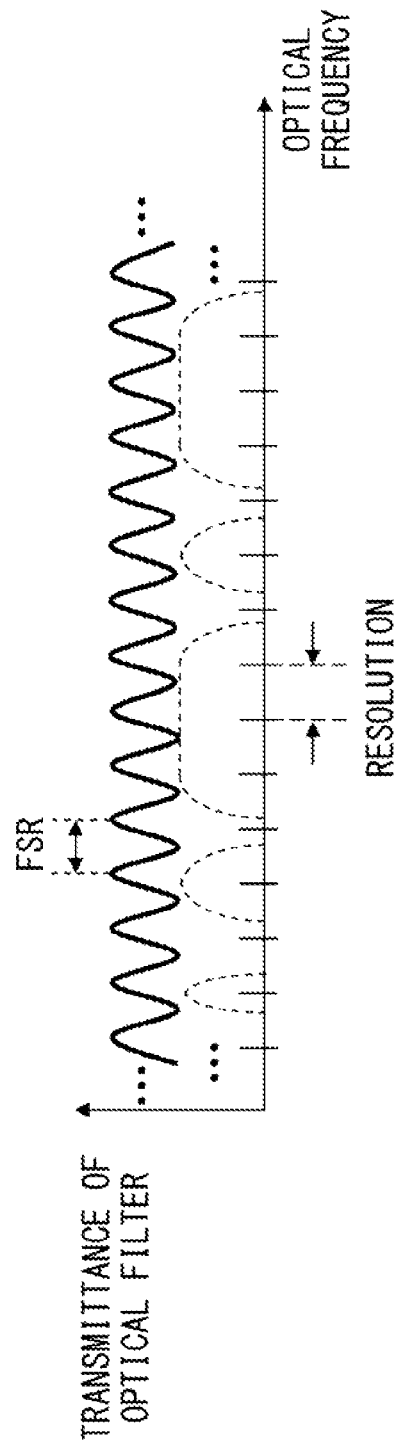
FIG. 9 is a diagram illustrating another example of an optical filter.

FIG. 9 illustrates another embodiment of the optical filter 41. Wavelength channels of the WDM transmission are allocated using a flexible frequency grid.

In the flexible frequency grid, frequency slots are specified. Each wavelength channel of the WDM transmission is allocated using one or a plurality of frequency slots. For example, one frequency slot is assigned to a wavelength channel whose symbol rate is low. A plurality of frequency slots are assigned to a wavelength channel whose symbol rate is high. In the example illustrated in FIG. 9, a wavelength channel to which one frequency slot is assigned, a wavelength channel to which two frequency slots are assigned, and a wavelength channel to which four frequency slots are assigned are present. The width of a frequency slot may be referred to as resolution or frequency resolution.

When the flexible frequency grid is adopted for the optical transmission system 1, the optical filter 41 is designed so as to have a free spectral range that has a relationship of an integral ratio with respect to the resolution of the width of the frequency slot. That is to say, a relation between a free spectral range of the optical filter 41 and a resolution of a frequency slot width of the WDM system may be expressed by a ratio of integers. Preferably, the free spectral range of the optical filter 41 is designed so as to be a fraction of an integer with respect to the resolution of the width of the frequency slot. In the example illustrated in FIG. 9, the free spectral range of the optical filter 41 is designed to be approximately equal to the resolution of the width of the frequency slot.

When the flexible frequency grid is adopted for the optical transmission system 1, the optical filter 41 may also be realized by using, for example, Fabry-Perot Etalon. In addition, the optical filter 41 may also be realized by DLI, superstructure FBG and the like.

Figure 10:
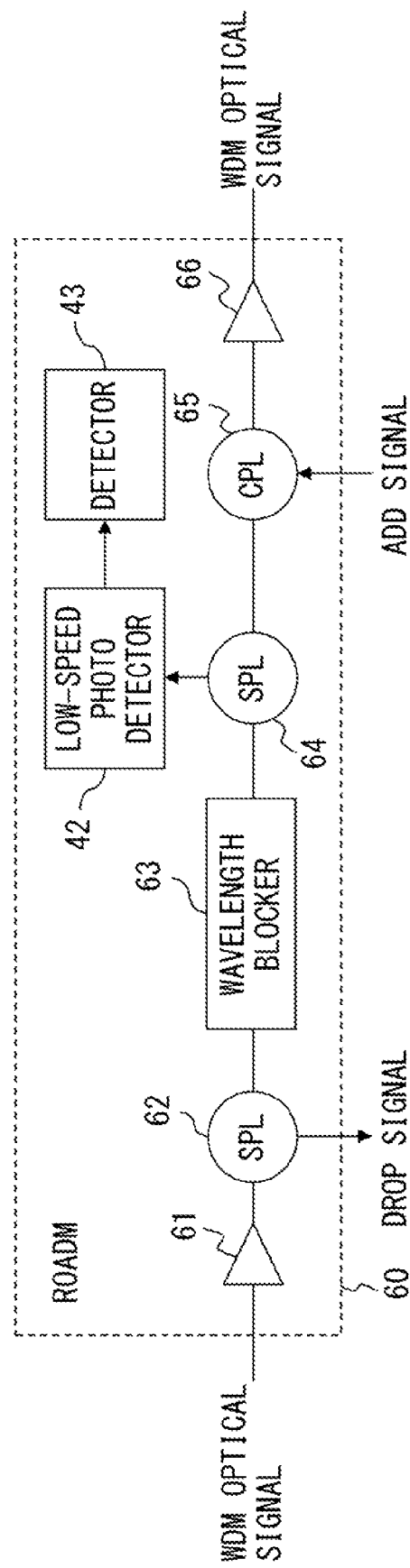
FIG. 10 is a diagram illustrating an example of a ROADM having a superimposed signal detection circuit.

FIG. 10 illustrates an example of a ROADM having a superimposed signal detection circuit. A ROADM 60 illustrated in FIG. 10 is an example of optical node equipment. The ROADM 60 illustrated in FIG. 10 has an optical amplifier 61, an optical splitter 62, a wavelength blocker 63, an optical splitter 64, an optical coupler 65, an optical amplifier 66, a low-speed photo detector 42, and a detector 43.

The optical amplifier 61 amplifies an input WDM optical signal. The optical splitter 62 guides the WDM optical signal amplified by the optical amplifier 61 to the wavelength blocker 63, and also splits the WDM optical signal to generate a drop signal. The drop signal is guided to, for example a wavelength selective demultiplexer or a demultiplexer that are not illustrated in FIG. 10. The wavelength selective demultiplexer selects a specified wavelength from the drop signal and guides the selected signal to a client terminal. The demultiplexer separates the drop signal for each wavelength. In this case, some or all of a plurality of optical signals obtained by the demultiplexer are guided to the client terminals.

The wavelength blocker 63 passes a specified wavelength in the input WDM optical signal according to an instruction from the network management system 10, and blocks other wavelengths, for example. The wavelength blocker 63 works as the optical filter 41 of the superimposed signal detection circuit 40 illustrated in FIG. 5, while this to be explained later.

The optical splitter 64 splits an optical signal output from the wavelength blocker 63 and to be guided to the optical coupler 65 and the low-speed photo detector 42. The optical coupler 65 couples an add signal and the optical signal output from the optical splitter 64 to generate an output WDM optical signal. The optical amplifier 66 amplifies the WDM optical signal obtained by the optical coupler 65.

The operations of the low-speed photo detector 42 and the detector 43 are as explained with reference to FIG. 5. The low-speed photo detector 42 converts the optical signal guided from the optical splitter 64 into an electric signal. The detector 43 detects a path ID respectively superimposed on one or a plurality of optical signal in the input WDM optical signal, from the electric signal generated by the low-speed photo detector 42.

Figure 11:
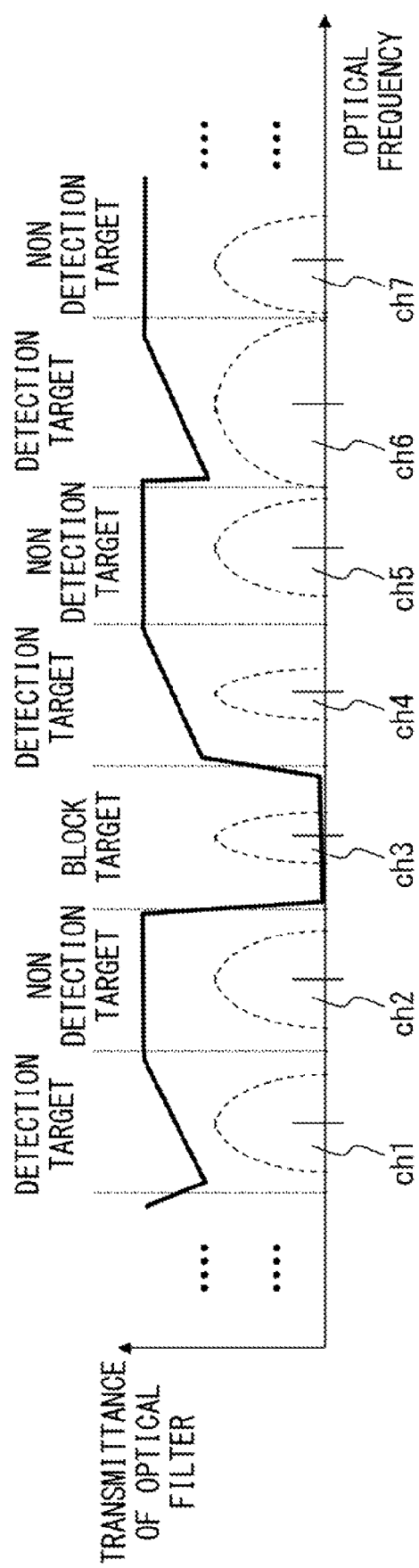
FIG. 11 is a diagram illustrating an optical filter realized by a wavelength blocker.

FIG. 11 is a diagram illustrating the optical filter realized by the wavelength blocker 63. Here, it is assumed that the input WDM optical signal includes wavelength channels ch1 through ch 7. The wavelength blocker 63 provides an optical filter function according to a selection instruction given from a user or the network management system 10, for example. Here, the selection instruction may specify one of three states for each wavelength channel. The first state is for blocking the input optical signal. The second state is for detecting the path ID signal superimposed on the input optical signal and passing the input optical signal. The third state is for passing the input optical signal without detecting the path ID signal. In the example illustrated in FIG. 11, the wavelength blocker 63 has received the following selection instructions.
(1) block the wavelength channel ch3 (first state)
(2) detect the path ID signal superimposed on the optical signal in the wavelength channels ch1, ch4, ch6 (second state)
(3) do not detect path ID signal in the wavelength channels ch2, ch5, ch7

In this case, the wavelength blocker 63 provides the transmission characteristics illustrated in FIG. 11. The wavelength blocker 63 provides a sufficiently small transmittance for the frequency area corresponding to the wavelength channel ch3. In addition, the wavelength blocker 63 provides a sufficiently large transmittance for the frequency area corresponding to the wavelength channels ch2, ch5, and ch7. The transmittance provided for the wavelength channels ch2, ch5, and ch7 are approximately constant with respect to the frequency. Furthermore, the wavelength blocker 63 provides a transmittance that is dependent on the frequency respectively to the frequency area corresponding to the wavelength channels ch1, ch4, and ch6. That is, the wavelength blocker 63 provides an optical filter having a frequency-dependent loss respectively to the wavelength channels ch1, ch4, and ch6. In the example illustrated in FIG. 11, in each frequency area corresponding to the wavelength channels ch1, ch4, ch6, the transmittance becomes larger as a frequency becomes high. However, depending on the features of the configuration/characteristics and the operating status of the optical filter, in some or all of the respective frequency areas corresponding to ch1, ch4, ch6, the transmittance may be smaller as the frequency becomes high.

The WDM optical signal including the wavelength channels ch1 through ch7 is input to the wavelength blocker 63. By so doing, the optical signal of the wavelength channel ch3 is blocked by the wavelength blocker 63. That is, the wavelength blocker 63 does not output the optical signal of the wavelength channel ch3. In addition, the optical signals of the wavelength channels ch2, ch5, ch7 are not blocked by the wavelength blocker 63. That is, the wavelength blocker 63 outputs the optical signals of the wavelength channels ch2, ch5, ch7.

The optical signals of the wavelength channels ch1, ch4, ch6 are output after filtered by the optical filter having frequency-dependent loss. The filtering operation using the optical filter having frequency-dependent loss is as described with reference to FIG. 6. Therefore, when the path ID signals are respectively superimposed by frequency modulation on the optical signals of the wavelength channels ch1, ch4, ch6, the average optical power of the output light of the wavelength blocker 63 changes according to the superimposed path ID signals. For example, when the path ID code 1 is superimposed on the optical signal of wavelength channel ch1 and the path ID code 4 is superimposed on the optical signal of wavelength channel ch4, the average optical power of the output light of the wavelength blocker 63 changes according to the path ID code 1 and the path ID code 4.

The output light of the wavelength blocker 63 is split by the optical splitter 64 and guided to the low-speed photo detector 42. The low-speed photo detector 42 averages the output optical power of the wavelength blocker 63, as illustrated with reference to FIG. 6. As a result, when the path ID signal is superimposed by frequency modulation on the optical signals of the wavelength channels ch1, ch4, ch6, an intensity modulated signal representing the path ID may be obtained by the low-speed photo detector 42. For example, when the path ID code 1 and the path ID code 4 are superimposed on the optical signals of the wavelength channels ch1 and ch4 respectively, the intensity modulated signal representing the path ID code 1 and the path ID code 4 is obtained by the low-speed photo detector 42. Therefore, the detector 43 can detect the two path IDs from the intensity modulated signal.

Thus, in the example illustrated in FIG. 10, the superimposed signal detection circuit is realized by using the wavelength blocker 63 built within the ROADM. In this configuration, the ROADM may detect the path ID signal superimposed on the optical signal of the specified wavelength channel while blocking other specified wavelengths. In addition, according to this configuration, since the wavelength blocker 63 is used as the wavelength-dependent loss optical filter, the space efficiency in the ROADM is high.

While the optical signals of the wavelength channels ch1, ch4, ch6 are filtered by the optical filter having frequency-dependent loss, they are output from the ROADM node without being blocked. Thus, the superimposed signal detection circuit of the embodiment can detect path ID signal from a desired wavelength channel while minimizing the influence to the signal quality of the wavelength channel, by appropriately setting the frequency-dependent loss characteristics of the optical filter.

Figure 12:
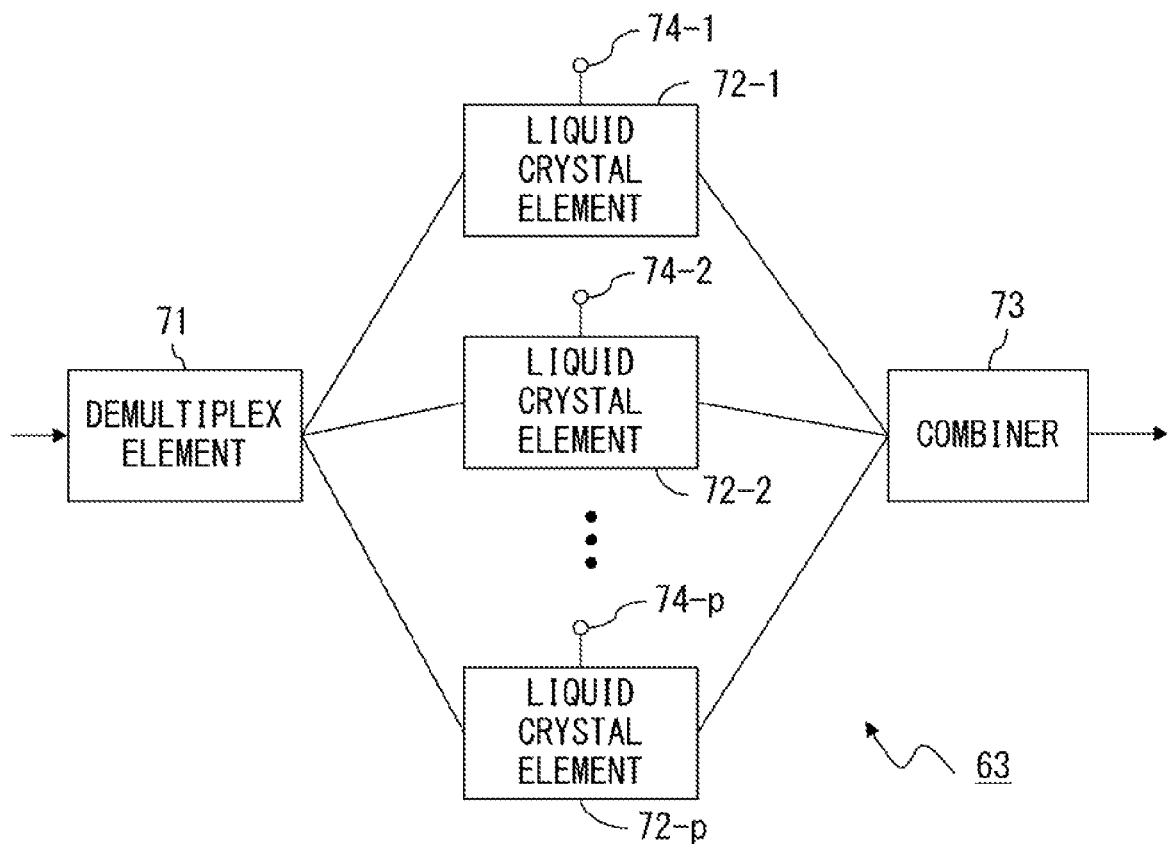
FIG. 12 is a diagram illustrating an example of the configuration of a wavelength blocker.

FIG. 12 illustrates an example of the configuration of the wavelength blocker 63. The wavelength blocker 63 has, in this example, demultiplex element 71, liquid crystal elements 72-1 through 72-p, and a combiner 73. The demultiplex element 71 demultiplexes an input WDM optical signal with respect to wavelength to be guided to the liquid crystal elements 72-1 through 72-p.

Control terminals 74-1 through 74-p are provided for the liquid crystal elements 72-1 through 72-p, respectively. The transmittance of the liquid crystal elements 72-1 through 72-p is controlled by the voltage respectively applied to the corresponding control terminals 74-1 through 74-p. The liquid crystal elements 72-1 through 72-p do not have to be separate from each other. The combiner 73 combines the output light of the liquid crystal elements 72-1 through 72-p.

FIG. 13 is a diagram illustrating the operation of the wavelength blocker 63. The wavelength blocker 63 has a plurality of liquid crystal elements as illustrated in FIG. 12, in this example. The transmittance of each liquid crystal element depends on the voltage applied through a corresponding control terminal. In the example illustrated in FIG. 13, when a voltage V1 is applied, the transmittance of the liquid crystal element is controlled to T1, where T1 is a transmittance that substantially blocks the input light. When a voltage V2 is applied, the transmittance of the liquid crystal element is controlled to T2, where T2 is a transmittance that passes the input signal with a small loss.

In the example illustrated in FIG. 13, three liquid crystal elements are assigned to one wavelength channel. For example, liquid crystal elements 72-1 through 72-3 are assigned to the wavelength channel ch1, liquid crystal elements 72-4 through 72-6 are assigned to the wavelength channel ch2, and liquid crystal element 72-7 through 72-9 are assigned to the wavelength channel ch3.

Applied voltages to the liquid crystal elements 72-1 through 72-3 are different from each other. In this example, the applied voltage of the liquid crystal element 72-2 is larger than the applied voltage of the liquid crystal element 72-1, and the applied voltage of the liquid crystal element 72-3 is higher than that of the liquid crystal elements 72-1, 72-2. In this case, the transmittance of the liquid crystal element 72-1, 72-2, 72-3 becomes larger in this order. As a result, an optical filter having a sloped transmittance with respect to the frequency is provided for wavelength channel ch1. Note that applied voltages to the liquid crystal element 72-1 through 72-3 are close to V2, so that the optical signal of the wavelength channel ch1 passes the wavelength blocker 63.

To all of the liquid crystal element 72-4 through 72-6, the voltage V2 is applied. As a result, since an optical filter having an approximately constant transmittance T2 is provided for the wavelength channel ch2, the optical signal of the wavelength channel ch2 passes the wavelength blocker 63. To the liquid crystal elements 72-7 through 72-9, the voltage V1 is applied. As a result, since an optical filter having an approximately constant transmittance T1 is provided for the wavelength channel ch3, the optical signal of the wavelength channel ch3 is blocked by the wavelength blocker 63. Explanation for other wavelength channels is omitted.

Thus, by controlling the applied voltage of each liquid crystal element, the optical filter having a desired transmission characteristic may be realized for each wavelength channel. Therefore, the ROADM may detect the path ID signal superimposed on the optical signal of one or plurality of desired wavelength channels, while blocking other specified wavelengths in the WDM optical signal.

Figure 14:
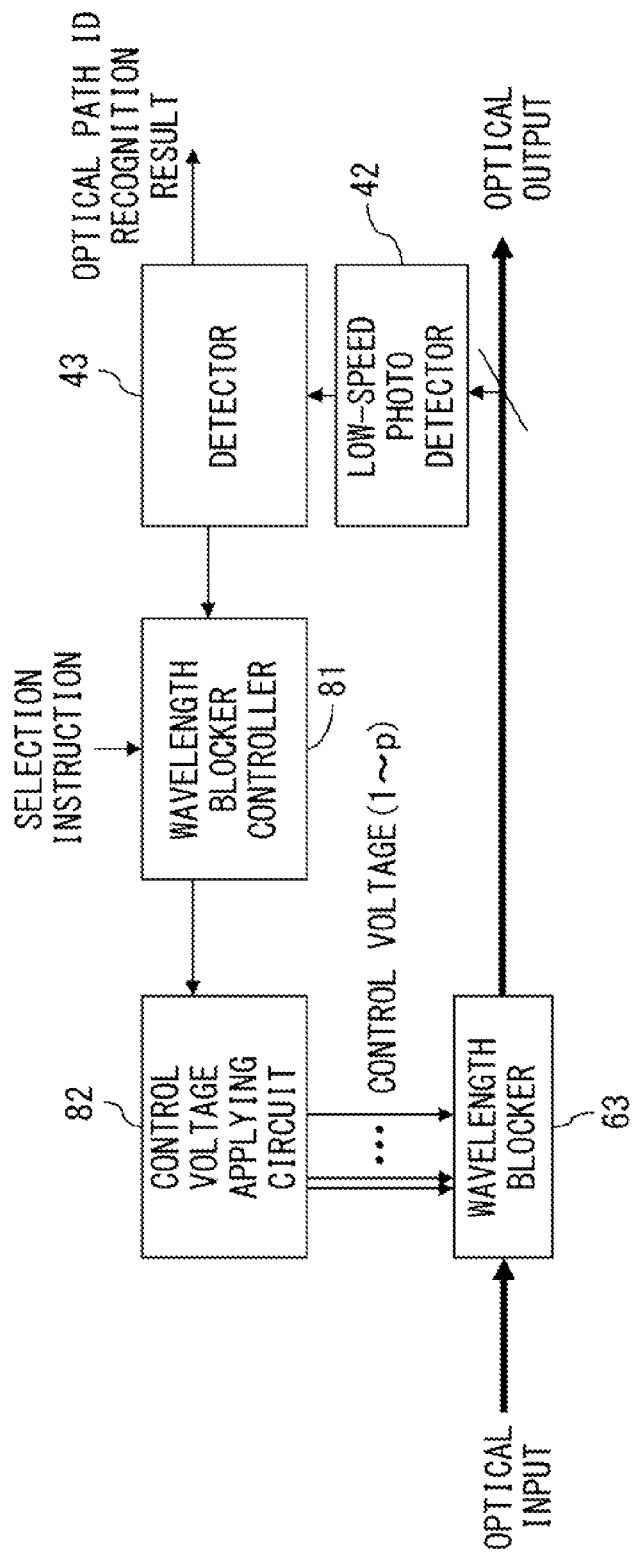
FIG. 14 is a diagram illustrating a control system to control a wavelength blocker.

FIG. 14 is a diagram illustrating the control system to control the wavelength blocker 63. In FIG. 14, a wavelength blocker controller 81 controls a control voltage applying circuit 82 according to a given selection instruction. At this time, the wavelength blocker controller 81 may control the control voltage applying circuit 82 according to the detection result of the path ID by the detector 43. The selection instruction may specify the wavelength channel to be blocked, the wavelength channel to be passed, the wavelength channel to be the target of detecting the path ID signal. In addition, the selection instruction is given from the user or the network management system 10, for example. Then, the control voltage applying circuit 82 generates a voltage to be applied to corresponding liquid crystal element in the wavelength blocker 63, according to the control by the wavelength blocker controller 81. The wavelength blocker controller 81 may be realized by the microcomputer including a processor.

Note that the liquid crystal elements 72-1 through 72-p in FIG. 12 may be replace by another configuration, such as optical spatial modulator pixels that may realize spatial optical modulation such as polarization control. For example, the liquid crystal elements 72-1 through 72-p may be realized by movable micro mirror array by MEMS (Micro Electro Mechanical Systems) and variable hologram elements.

Figure 15:
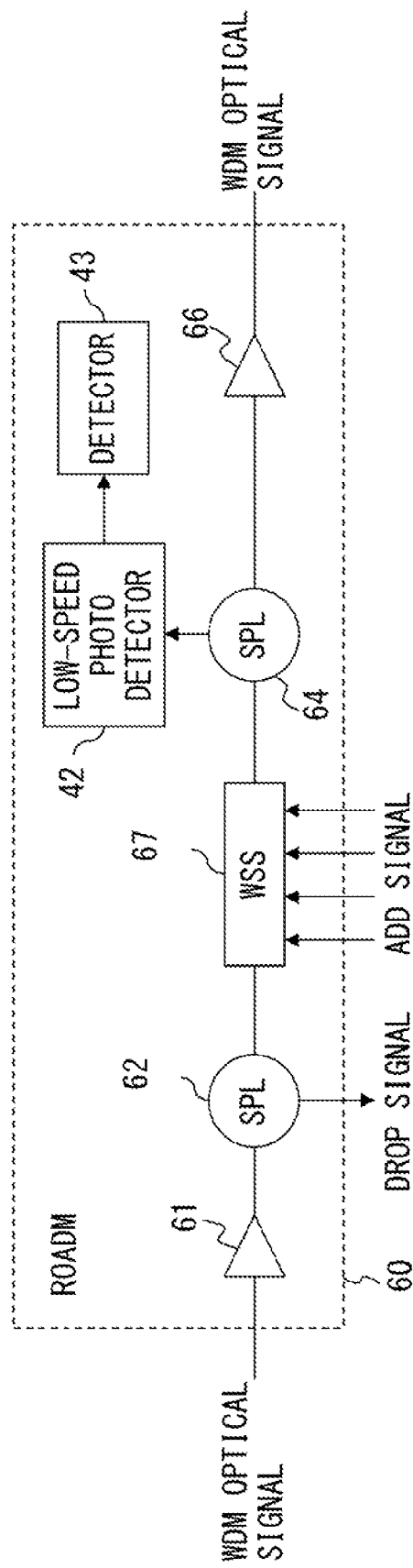
FIG. 15 is a diagram illustrating another example of ROADM having a superimposed signal detection circuit.

FIG. 15 illustrates another example of ROADM having a superimposed signal detection circuit. In the example illustrated in FIG. 15, a ROADM 60 has an optical amplifier 61, an optical splitter 62, a wavelength selective switch (WSS: Wavelength Selective Switch) 67, an optical splitter 64, an optical amplifier 66, the low-speed photo detector 42, and the detector 43.

The wavelength selective switch 67 selects one or more specified wavelengths from the input WDM optical signal and add signals. The wavelength selective switch 67 provides an optical filter function similar to the wavelength blocker 63 illustrated in FIG. 10. However, the wavelength selective switch 67 has a plurality of input ports. That is, the wavelength selective switch 67 has one or a plurality of ports to receive add signals, in addition to the port to receive the input WDM optical signal. In addition, the wavelength selective switch 67 may also have a plurality of output ports. The configuration and the operation of the wavelength selective 67 may be understood by those who are skilled in the art in the technical field of the present invention from the configuration and operation of the wavelength blocker 63 illustrated in FIG. 10, therefore, further explanation for the wavelength selective 67 is omitted.

Thus, the superimposed signal detection circuit 40 of the embodiment may be realized, in the ROADM 60, using the wavelength selective switch 67, the low-speed photo detector 42, and the detector 43.

The superimposed signal detection circuit 40 may be realized by a wavelength selective demultiplexer 91, the low-speed photo detector 42, and the detector 43 in the ROADM as illustrated in FIG. 16A. The wavelength selective demultiplexer 91 can select a specified wavelength from the WDM optical signal split by the optical splitter 62. The optical signal of the wavelength selected by the wavelength selective demultiplexer 91 is transmitted to a client terminal as a drop signal. In addition, the wavelength selective demultiplexer 91 has an optical filter function similar to the wavelength blocker 63 illustrated in FIG. 10.

At least one optical signal selected by the wavelength selective demultiplexer 91 is guided to the low-speed photo detector 42. When a plurality of optical singles are guided from the selective demultiplexer 91 to the low-speed photo detector 42, for example, those plurality of optical signals may be combined by using an optical coupler or an optical selector, for example. The low-speed photo detector 42 converts the output light of the wavelength selective demultiplexer 91 into an electric signal, and the detector 43 detects the path ID signal from the electric signal.

The superimposed signal detection circuit 40 may be realized by a wavelength selective multiplexer 92, the low-speed photo detector 42, the detector 43 in the ROADM, as illustrated in FIG. 16B. The wavelength selective multiplexer 92 selects one or more add signals to be inserted into the output WDM optical signal, from a plurality of add signals. Then, the wavelength selective multiplexer 92 combines the selected add signals to be guided to the optical coupler 65. The wavelength selective multiplexer 92 provides an optical filter function similar to the wavelength blocker 63 illustrated in FIG. 10.

The output light of the wavelength selective multiplexer 92 is also guided to the low-speed photo detector 42 using an optical splitter and the like. The low-speed photo detector 42 converts the output light of wavelength selective multiplexer 92 into an electric signal, and the detector 43 detects the path ID signal from the electric signal.

In the ROADM 60 illustrated in FIG. 10, when the wavelength blocker 63 has an optical channel monitor (OCM) to control the optical filter (the liquid crystal elements illustrated in FIG. 12), the superimposed signal detection circuit may include the OCM instead of the low-speed photo detector 42. In a similar manner, in the ROADM illustrated in FIG. 15, FIG. 16A, FIG. 16B, the superimposed signal detection circuit may include the OCM provided in the wavelength selective switch 67, the wavelength selective demultiplexer 91, and the wavelength selective multiplexer 92 in place of the low-speed photo detector 42. According to these configurations, since there is no need to provide a dedicated photo detector to detect the superimposed signal, the cost may be reduced. Furthermore, since the OCM measures the optical power for each wavelength component of input light, it may be possible to check the detection result of the path ID while associating with the signal wavelength. By this function, in a case in which there was a mistake in the setting of the optical wavelength at the transmitter for example, it becomes possible to detect the mistake.

Figure 17:
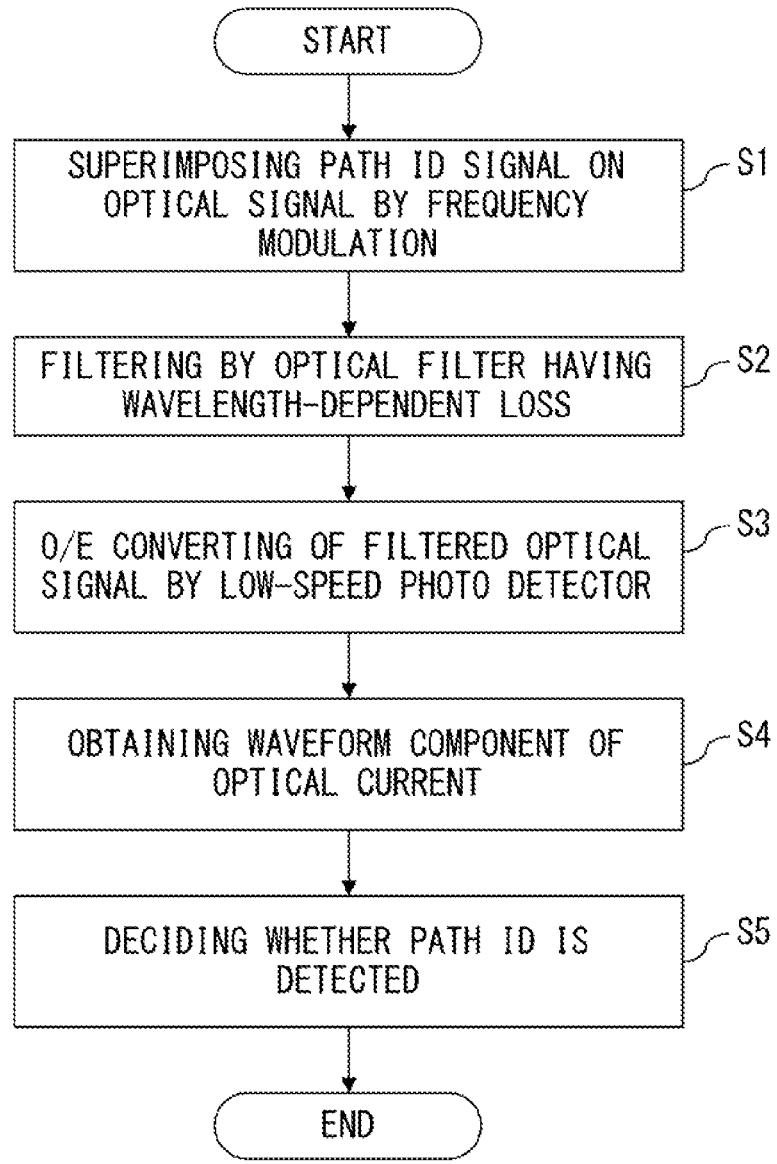
FIG. 17 is a flowchart illustrating a superimposed signal transmission method of an embodiment.

FIG. 17 is a flowchart illustrating a superimposed signal transmission method of the embodiment. The processes in the flowchart are performed by the optical transmitter illustrated in FIG. 3A or 3B, and the superimposed signal detection circuit illustrated in FIG. 5, for example.

In S1, the optical transmitter superimposes the path ID signal on an optical signal carrying a data signal by frequency modulation. The rate of the path ID signal is sufficiently low compared with the symbol rate of the data signal. In addition, the path ID signal is realized by, for example, a code or a tone signal.

In S2, the superimposed signal detection circuit 40 filters the optical signal on which the path ID signal is superimposed, using the optical filter 41. The optical filter 41 has wavelength-dependent loss.

In S3, the low-speed photo detector 42 converts the optical signal filtered by the optical filter 41 into an electric signal. The bandwidth of the low-speed photo detector 42 is lower than the symbol rate of the data signal, and is higher enough to detect the path ID signal. As a result, an electric signal waveform representing the path ID may be obtained.

In S4, the detector 43 obtains the waveform component of an electric signal (optical current) generated by the low-speed photo detector 42. The waveform component corresponds to the path ID signal. In S5, the detector 43 identifies the path ID based on the waveform component obtained in S4. When the path ID is represented by a code, the detector 43 identifies the path ID using a correlator. When the path ID is represented by a tone signal, the detector 43 identifies the path ID by frequency detection. Note that S2-S5 are an example of a superimposed signal detection method.

S1 of the flowchart is performed by the optical transmitters 21-1 through 21-n, for example. At this time, the optical transmitters 21-1 through 21-n may superimpose the path ID signal on corresponding optical signal at the same time. In this case, the superimposed signal detection circuit 40 detects a plurality of path IDs at the same time, in S5. In addition, the optical transmitters 21-1 through 21-n may superimpose the path ID signal on a corresponding optical signal sequentially. In this case, the superimposed signal detection circuit 40 detects each path ID sequentially by repeating the processes in S2 through S5. By so doing, the superimposed signal detection circuit 40 can detect the path ID associating with wavelength λ1 through λn.

In the description above, the path ID signal that identifies the optical path is superimposed on the optical signal carrying data signal. However, the present embodiment is not limited to the configuration or the method to superimpose the path ID signal on the optical signal. That is, the present invention may be applied to a configuration and a method to superimpose any signal on an optical signal.

In addition, the superimposed signal detection circuit and method of the embodiment may be applied to a polarization multiplex system. In the polarization multiplex system, each wavelength channel may carry two optical signals (X polarization optical signal and Y polarization optical signal) using two polarizations (X polarization and Y polarization) that are orthogonal to each other. In this system, the optical transmitter may superimpose different ID signals on the X polarization optical signal and Y polarization optical signal in stead of superimposing the same ID signal on the X polarization optical signal and Y Polarization optical signal. Alternatively, the path ID signal may be superimposed on either one of the X polarization optical signal and the Y polarization optical signal.

In this case, in the superimposed signal detection circuit provided in the optical node equipment, the polarization multiplexed optical signal may be input to the optical filter 41 without being separated for each polarization. The low-speed photo detector 42 converts the polarization multiplexed optical signal filtered by the optical filter 41 into an electric signal. The detector 43 detects the path ID signal superimposed on the X polarization optical signal and the Y polarization optical signal, respectively. That is, as the optical filter 41 and the low-speed photo detector 42, a device that is not dependent on the polarization may be used. Thus, according to the superimposed signal detection circuit and method of the embodiment, the signal superimposed on an optical signal may be detected without using a polarization processing device such as a polarization demultiplexer, polarization controller and a polarizer, even in a polarization multiplex system.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present inventions has (have) been described in detail, it should be understood that the various changes, substitutions, and alterations could be made hereto without departing from the spirit and scope of the invention.

What is claimed is:

1. A superimposed signal detection circuit that detects a signal superimposed on an optical signal in a WDM system, the superimposed signal detection circuit comprising:
    an optical filter having wavelength-dependent loss configured to filter a plurality of optical signals on which a corresponding superimposed signal is superimposed by frequency modulation;
    a photo detector configured to convert the plurality of optical signals filtered by the optical filter into an electric signal; and
    a detector configured to obtain information indicated by the superimposed signal respectively superimposed on the plurality of optical signals from the electric signal obtained by the photo detector, wherein a transmittance of the optical filter is tilted at and around a center wavelength of respective wavelength channels with respect to wavelength for the respective wavelength channels of at least one of the plurality of optical signals, and the detector detects a value of the superimposed signal based on a change in power of output light from the optical filter for the respective wavelength channels of at least one of the plurality of optical signals, and the frequency of the optical signal is modulated according to a value of the superimposed signal and the optical filter is configured to provide different transmittances for respective wavelengths corresponding to frequencies that correspond to respective values of the superimposed signal.

2. The superimposed signal detection circuit according to claim 1, wherein
a ratio between a free spectral range of the optical filter and a spacing of wavelength channels of the WDM system is expressed by integers.

3. The superimposed signal detection circuit according to claim 1, wherein
a ratio between a free spectral range of the optical filter and a resolution of a frequency slot width of the WDM system is expressed by integers.

4. The superimposed signal detection circuit according to claim 1, wherein
a bandwidth of the photo detector is lower than a symbol rate of data signal carried by the optical signal, and higher than half of a modulation rate of the superimposed signal.

5. A superimposed signal detection circuit that detects a signal superimposed on an optical signal in a WDM system, the superimposed signal detection circuit comprising:
an optical filter having wavelength-dependent loss configured to filter a plurality of optical signals on which a corresponding superimposed signal is superimposed by frequency modulation;
a photo detector configured to convert the plurality of optical signals filtered by the optical filter into an electric signal; and
a detector configured to obtain information indicated by the superimposed signal respectively superimposed on the plurality of optical signals from the electric signal obtained by the photo detector, wherein
a transmittance of the optical filter is tilted with respect to wavelength for respective wavelength bands of at least one of the plurality of optical signals, and wherein
the optical filter includes:
a plurality of optical filter elements;
an optical demultiplexer configured to separate a WDM optical signal with respect to wavelength to be guided to the plurality of the optical filter elements, the WDM optical signal including a plurality of optical signals on which corresponding superimposed signal is respectively superimposed by frequency modulation, two or more of the optical filter elements being allocated to each of the optical signals in the WDM optical signal and each of the optical signals being guided to the allocated two or more of the optical filter elements;
a controller configured to control a transmittance of the plurality of optical filter elements; and
an optical combiner configured to combine output optical signals of the plurality of optical filter elements.

6. The superimposed signal detection circuit according to claim 5, wherein the controller controls a transmittance of an optical filter element corresponding to a specified wavelength channel in the WDM optical signal to change depending on wavelength, and
the detector detects a superimposed signal superimposed on an optical signal of the specified wavelength channel.

7. Optical node equipment provided in a WDM transmission system, the optical node equipment comprising:
an optical filter having wavelength-dependent loss configured to filter a plurality of optical signals on which a corresponding superimposed signal is superimposed by frequency modulation;
a photo detector configured to convert the plurality of optical signals filtered by the optical filter into an electric signal; and
a detector configured to obtain information indicated by the superimposed signal respectively superimposed on the plurality of optical signals from the electric signal obtained by the photo detector, wherein
a transmittance of the optical filter is tilted at and around a center wavelength of respective wavelength channels with respect to wavelength for the respective wavelength channels of at least one of the plurality of optical signals, and the detector detects a value of the superimposed signal based on a change in power of output light from the optical filter for the respective wavelength channels of at least one of the plurality of optical signals, and the frequency of the optical signal is modulated according to a value of the superimposed signal and the optical filter is configured to provide different transmittances for respective wavelengths corresponding to frequencies that correspond to respective values of the superimposed signal.

8. The optical node equipment according to claim 7, wherein
the optical filter is a wavelength blocker, a wavelength selective switch, a wavelength selective demultiplexer, or a wavelength selective multiplexer.

9. Optical node equipment provided in a WDM transmission system, the optical node equipment comprising:
an optical filter having wavelength-dependent loss configured to filter a plurality of optical signals on which a corresponding superimposed signal is superimposed by frequency modulation;
a photo detector configured to convert the plurality of optical signals filtered by the optical filter into an electric signal; and
a detector configured to obtain information indicated by the superimposed signal respectively superimposed on the plurality of optical signals from the electric signal obtained by the photo detector, wherein
a transmittance of the optical filter is tilted with respect to wavelength for respective wavelength bands of at least one of the plurality of optical signals, and wherein
the optical filter includes:
a plurality of optical filter elements;
an optical demultiplexer configured to separate a WDM optical signal with respect to wavelength to be guided to the plurality of the optical filter elements, the WDM optical signal including a plurality of optical signals on which corresponding superimposed signal is respectively superimposed by frequency modulation, two or more of the optical filter elements being allocated to each of the optical signals in the WDM optical signal and each of the optical signals being guided to the allocated two or more of the optical filter elements;
a controller configured to control a transmittance of the plurality of optical filter elements; and
an optical combiner configured to combine output optical signals of the plurality of optical filter elements.

10. Optical node equipment provided in a WDM transmission system, the optical node equipment comprising:
an optical filter having wavelength-dependent loss configured to filter a plurality of optical signals on which a corresponding superimposed signal is superimposed by frequency modulation;
a photo detector configured to convert the plurality of optical signals filtered by the optical filter into an electric signal; and
a detector configured to obtain information indicated by the superimposed signal respectively superimposed on the plurality of optical signals from the electric signal obtained by the photo detector, wherein
a transmittance of the optical filter is tilted with respect to wavelength for respective wavelength bands of at least one of the plurality of optical signals, and wherein
the optical filter includes:
a plurality of optical filter elements;
an optical demultiplexer configured to separate a WDM optical signal with respect to wavelength to be guided to the plurality of the optical filter elements, the WDM optical signal including a plurality of optical signals on which corresponding superimposed signal is respectively superimposed by frequency modulation;
a controller configured to control a transmittance of the plurality of optical filter elements; and
an optical combiner configured to combine output optical signals of the plurality of optical filter elements, wherein
the controller controls a transmittance of a first optical filter element so as to block input light, the first optical filter element corresponding to a wavelength channel to which a selection instruction indicating a first state being applied; and
the controller controls a transmittance of a second optical filter element so as to change depending on a wavelength, the second optical filter element corresponding to a wavelength channel to which a selection instruction indicating a second state being applied.

11. The optical node equipment according to claim 10, wherein
the controller controls a transmittance of a third optical filter element so as to pass input light substantially without depending on a wavelength, the third optical filter element corresponding to a wavelength channel to which a selection instruction indicating a third state being applied.

12. An optical transmission system including a WDM transmission equipment that transmits a WDM optical signal and optical node equipment that processes the WDM optical signal; wherein
the WDM transmission equipment includes an optical transmitter configured to superimpose a corresponding superimposed signal on a plurality of optical signals included in the WDM optical signal; and
the optical node equipment includes:
an optical filter having wavelength-dependent loss configured to filter the plurality of optical signals;
a photo detector configured to convert the plurality of optical signals filtered by the optical filter into an electric signal; and
a detector configured to obtain information indicated by the superimposed signal respectively superimposed on the plurality of optical signals from the electric signal obtained by the photo detector, wherein
a transmittance of the optical filter is tilted at and around a center wavelength of respective wavelength channels with respect to wavelength for the respective wavelength channels of at least one of the plurality of optical signals, and
the detector detects a value of the superimposed signal based on a change in power of output light from the optical filter for the respective wavelength channels of at least one of the plurality of optical signals, and
the frequency of the optical signal is modulated according to a value of the superimposed signal and the optical filter is configured to provide different transmittances for respective wavelengths corresponding to frequencies that correspond to respective values of the superimposed signal.

13. Optical node equipment provided in a WDM transmission system, the optical node equipment comprising:
a wavelength blocker including an optical filter having wavelength-dependent loss configured to filter a plurality of optical signals on which a corresponding superimposed signal is superimposed by frequency modulation and an optical channel monitor configured to convert the plurality of optical signals filtered by the optical filter into an electric signal so as to monitor the plurality of optical signals; and
a detector configured to obtain information indicated by the superimposed signal respectively superimposed on the plurality of optical signals from the electric signal obtained by the optical channel monitor, wherein
a transmittance of the optical filter is tilted at and around a center wavelength of respective wavelength channels with respect to wavelength for the respective wavelength channels of at least one of the plurality of optical signals, and
the detector detects a value of the superimposed signal based on a change in power of output light from the optical filter for the respective wavelength channels of at least one of the plurality of optical signals, and
the frequency of the optical signal is modulated according to a value of the superimposed signal and the optical filter is configured to provide different transmittances for respective wavelengths corresponding to frequencies that correspond to respective values of the superimposed signal.

14. Optical node equipment provided in a WDM transmission system, the optical node equipment comprising:
a wavelength selective switch including an optical filter having wavelength-dependent loss configured to filter a plurality of optical signals on which a corresponding superimposed signal is superimposed by frequency modulation and an optical channel monitor configured to convert the plurality of optical signals filtered by the optical filter into an electric signal so as to monitor the plurality of optical signals; and
a detector configured to obtain information indicated by the superimposed signal respectively superimposed on the plurality of optical signals from the electric signal obtained by the optical channel monitor, wherein
a transmittance of the optical filter is tilted at and around a center wavelength of respective wavelength channels with respect to wavelength for the respective wavelength channels of at least one of the plurality of optical signals, and the detector detects a value of the superimposed signal based on a change in power of output light from the optical filter for the respective wavelength channels of at least one of the plurality of optical signals, and the frequency of the optical signal is modulated according to a value of the superimposed signal and the optical filter is configured to provide different transmittances for respective wavelengths corresponding to frequencies that correspond to respective values of the superimposed signal.

* * * * *